US011178260B2

(12) United States Patent
Masputra et al.

(10) Patent No.: US 11,178,260 B2
(45) Date of Patent: Nov. 16, 2021

(54) METHODS AND APPARATUS FOR DYNAMIC PACKET POOL CONFIGURATION IN NETWORKING STACK INFRASTRUCTURES

(71) Applicant: Apple Inc., Cupertino, CA (US)

(72) Inventors: Cahya Adiansyah Masputra, San Jose, CA (US); Sandeep Nair, Cupertino, CA (US); Zeh-Chen Liu, Cupertino, CA (US); Wei Shen, Cupertino, CA (US); Olivier Mardinian, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/363,495

(22) Filed: Mar. 25, 2019

(65) Prior Publication Data

US 2019/0306087 A1    Oct. 3, 2019

Related U.S. Application Data

(60) Provisional application No. 62/649,509, filed on Mar. 28, 2018.

(51) Int. Cl.
*H04L 29/06* (2006.01)
*H04L 12/46* (2006.01)
(Continued)

(52) U.S. Cl.
CPC .......... *H04L 69/162* (2013.01); *G06F 3/0604* (2013.01); *G06F 3/0631* (2013.01); *G06F 3/0644* (2013.01); *G06F 3/0673* (2013.01); *G06F 9/45558* (2013.01); *G06F 9/461* (2013.01); *G06F 9/4881* (2013.01); *G06F 9/5005* (2013.01); *G06F 9/5016* (2013.01); *G06F 9/5022* (2013.01); *G06F 9/52* (2013.01);
(Continued)

(58) Field of Classification Search
CPC ... H04L 69/162; H04L 69/02; H04L 47/6295; H04L 47/743; H04L 49/9052; G06F 16/2228; G06F 13/00; G06F 12/16
See application file for complete search history.

(56) References Cited

U.S. PATENT DOCUMENTS 5,367,688 A    11/1994   Croll
6,032,179 A *   2/2000   Osborne ............... G06F 13/128
                                                    709/212

(Continued)

*Primary Examiner* — Nam T Tran
(74) *Attorney, Agent, or Firm* — Sterne, Kessler, Goldstein & Fox P.L.L.C.

(57) ABSTRACT

Methods and apparatus for dynamic packet pool configuration in networking stack architectures. Unlike prior art monolithic memory allocations, embodiments of the present disclosure enable packet pools associated with non-kernel space applications to dynamically allocate additional memory allocations to a given non-kernel space application, or conversely, de-allocate memory allocations to a given non-kernel space application. Variants also disclose the splitting up of a memory allocation into device accessible portions and kernel accessible portions. Other variants disclose sizing certain segment allocations so as to be a multiple of a physical address page size. Such a variant enables a single input/output (I/O) bus address lookup for the given segment so as to minimize look up costs associated with an I/O lookup for the given segment.

20 Claims, 16 Drawing Sheets

(51) Int. Cl.

| | | |
|---|---|---|
| *G06F 9/54* | (2006.01) | |
| *G06F 9/48* | (2006.01) | |
| *G06F 9/50* | (2006.01) | |
| *G06F 12/10* | (2016.01) | |
| *G06F 13/16* | (2006.01) | |
| *G06F 3/06* | (2006.01) | |
| *G06F 9/46* | (2006.01) | |
| *G06F 12/02* | (2006.01) | |
| *H04L 12/859* | (2013.01) | |
| *H04L 12/851* | (2013.01) | |
| *H04L 12/863* | (2013.01) | |
| *H04L 12/935* | (2013.01) | |
| *H04L 12/861* | (2013.01) | |
| *G06F 9/455* | (2018.01) | |
| *H04L 12/801* | (2013.01) | |
| *H04L 12/841* | (2013.01) | |
| *G06F 9/52* | (2006.01) | |
| *H04L 12/26* | (2006.01) | |
| *G06F 16/23* | (2019.01) | |
| *G06F 21/52* | (2013.01) | |
| *H04L 12/833* | (2013.01) | |
| *H04L 12/835* | (2013.01) | |
| *H04L 12/823* | (2013.01) | |
| *H04L 12/865* | (2013.01) | |
| *G06F 21/56* | (2013.01) | |
| *G06F 16/22* | (2019.01) | |
| *H04L 29/12* | (2006.01) | |
| *H04L 29/08* | (2006.01) | |
| *H04L 1/00* | (2006.01) | |

(52) U.S. Cl.
CPC ............ *G06F 9/542* (2013.01); *G06F 9/545* (2013.01); *G06F 12/023* (2013.01); *G06F 12/10* (2013.01); *G06F 13/1668* (2013.01); *G06F 16/2228* (2019.01); *G06F 16/2365* (2019.01); *G06F 21/52* (2013.01); *G06F 21/568* (2013.01); *H04L 12/4641* (2013.01); *H04L 43/0864* (2013.01); *H04L 47/193* (2013.01); *H04L 47/2458* (2013.01); *H04L 47/2475* (2013.01); *H04L 47/2483* (2013.01); *H04L 47/283* (2013.01); *H04L 47/30* (2013.01); *H04L 47/32* (2013.01); *H04L 47/6275* (2013.01); *H04L 47/6295* (2013.01); *H04L 49/30* (2013.01); *H04L 49/9052* (2013.01); *H04L 61/103* (2013.01); *H04L 61/2542* (2013.01); *H04L 63/166* (2013.01); *H04L 67/146* (2013.01); *H04L 69/02* (2013.01); *H04L 69/161* (2013.01); *H04L 69/163* (2013.01); *H04L 69/164* (2013.01); *H04L 69/18* (2013.01); *H04L 69/22* (2013.01); *G06F 9/50* (2013.01); *G06F 2009/45595* (2013.01); *G06F 2209/5011* (2013.01); *G06F 2212/657* (2013.01); *G06F 2221/032* (2013.01); *G06F 2221/034* (2013.01); *H04L 1/0061* (2013.01)

(56) References Cited

U.S. PATENT DOCUMENTS

| | | | |
|---|---|---|---|
| 6,874,075 B2* | 3/2005 | Jerding | H04L 69/24 |
| | | | 711/148 |
| 7,100,020 B1 | 8/2006 | Brightman et al. | |
| 7,152,231 B1 | 12/2006 | Galluscio et al. | |
| 7,398,382 B2 | 7/2008 | Rothman et al. | |
| 7,403,542 B1 | 7/2008 | Thompson | |
| 7,506,084 B2 | 3/2009 | Moerti et al. | |
| 7,587,575 B2 | 9/2009 | Moertl et al. | |
| 7,590,817 B2 | 9/2009 | Moertl et al. | |
| 7,617,377 B2 | 11/2009 | Moertl et al. | |
| 7,941,682 B2 | 5/2011 | Adams | |
| 8,214,707 B2 | 7/2012 | Munson et al. | |
| 8,230,248 B2 | 7/2012 | Dance et al. | |
| 8,255,725 B2 | 8/2012 | Shimazaki et al. | |
| 8,352,624 B2 | 1/2013 | Zimmerman et al. | |
| 8,555,099 B2 | 10/2013 | Marinkovic et al. | |
| 8,769,168 B2 | 7/2014 | Moertl et al. | |
| 9,049,179 B2 | 6/2015 | Luna | |
| 9,170,957 B2 | 10/2015 | Touzni et al. | |
| 9,280,360 B2 | 3/2016 | Xu et al. | |
| 9,594,718 B2 | 3/2017 | Kaushik et al. | |
| 9,959,124 B1 | 5/2018 | Herbeck et al. | |
| 9,985,904 B2 | 5/2018 | Shalev et al. | |
| 10,078,361 B2 | 9/2018 | Sanghi et al. | |
| 10,230,608 B2 | 3/2019 | Tsirkin | |
| 10,289,555 B1 | 5/2019 | Michaud et al. | |
| 10,331,600 B1 | 6/2019 | Rajadnya et al. | |
| 10,534,601 B1 | 1/2020 | Venkata et al. | |
| 2001/0037410 A1 | 11/2001 | Gardner | |
| 2002/0053011 A1* | 5/2002 | Aiken | G06F 9/5016 |
| | | | 711/170 |
| 2002/0169938 A1 | 11/2002 | Scott et al. | |
| 2003/0061395 A1 | 3/2003 | Kingsbury et al. | |
| 2004/0010473 A1 | 1/2004 | Hsu et al. | |
| 2004/0010545 A1 | 1/2004 | Pandya | |
| 2005/0055406 A1* | 3/2005 | Singhai | H04L 69/162 |
| | | | 709/206 |
| 2005/0076244 A1 | 4/2005 | Watanabe | |
| 2005/0140683 A1* | 6/2005 | Collins | G06F 9/5016 |
| | | | 345/531 |
| 2005/0278498 A1 | 12/2005 | Ahluwalia et al. | |
| 2006/0075119 A1 | 4/2006 | Hussain et al. | |
| 2006/0136570 A1 | 6/2006 | Pandya | |
| 2007/0183418 A1 | 8/2007 | Riddoch et al. | |
| 2007/0226375 A1 | 9/2007 | Chu et al. | |
| 2007/0255802 A1 | 11/2007 | Aloni et al. | |
| 2008/0005794 A1 | 1/2008 | Inoue et al. | |
| 2008/0148291 A1 | 6/2008 | Huang et al. | |
| 2009/0240874 A1 | 9/2009 | Pong | |
| 2009/0265723 A1 | 10/2009 | Mochizuki et al. | |
| 2010/0005014 A1 | 1/2010 | Castle et al. | |
| 2010/0017655 A1 | 1/2010 | Gooding et al. | |
| 2010/0118041 A1 | 5/2010 | Chen et al. | |
| 2011/0035575 A1 | 2/2011 | Kwon | |
| 2011/0083002 A1 | 4/2011 | Albers et al. | |
| 2011/0161619 A1 | 6/2011 | Kaminski et al. | |
| 2011/0219208 A1 | 9/2011 | Asaad et al. | |
| 2011/0246742 A1 | 10/2011 | Kogen et al. | |
| 2011/0292936 A1 | 12/2011 | Wang et al. | |
| 2012/0036334 A1* | 2/2012 | Horman | G06F 9/52 |
| | | | 711/165 |
| 2012/0203880 A1 | 8/2012 | Kluyt et al. | |
| 2012/0260017 A1 | 10/2012 | Mine et al. | |
| 2013/0067188 A1 | 3/2013 | Mehra et al. | |
| 2013/0204927 A1 | 8/2013 | Kruglikov et al. | |
| 2013/0205113 A1 | 8/2013 | Ahmad et al. | |
| 2013/0275976 A1 | 10/2013 | Dawson et al. | |
| 2014/0068624 A1 | 3/2014 | Fuller et al. | |
| 2014/0068636 A1 | 3/2014 | Dupont et al. | |
| 2014/0122695 A1 | 5/2014 | Kulikov et al. | |
| 2014/0189057 A1 | 7/2014 | Sankoda et al. | |
| 2015/0007262 A1 | 1/2015 | Aissi et al. | |
| 2015/0081985 A1 | 3/2015 | Archer et al. | |
| 2015/0156122 A1 | 6/2015 | Singh et al. | |
| 2015/0172345 A1 | 6/2015 | Mantin et al. | |
| 2015/0244804 A1 | 8/2015 | Warfield et al. | |
| 2015/0261588 A1 | 9/2015 | Liu et al. | |
| 2015/0326542 A1 | 11/2015 | Serebrin | |
| 2015/0363110 A1 | 12/2015 | Batra et al. | |
| 2016/0044143 A1 | 2/2016 | Narasimhamurthy | |
| 2016/0103480 A1 | 4/2016 | Sanghi et al. | |
| 2016/0226957 A1 | 8/2016 | Zhang et al. | |
| 2016/0226967 A1 | 8/2016 | Zhang et al. | |
| 2016/0231929 A1 | 8/2016 | Tsirkin | |
| 2016/0261632 A1 | 9/2016 | Kolhi et al. | |
| 2016/0357443 A1 | 12/2016 | Li et al. | |

(56) References Cited

U.S. PATENT DOCUMENTS

| | | |
|---|---|---|
| 2016/0378545 A1 | 12/2016 | Ho |
| 2017/0003997 A1 | 1/2017 | Kelly et al. |
| 2017/0075856 A1 | 3/2017 | Suzue et al. |
| 2017/0111283 A1 | 4/2017 | Kumar et al. |
| 2017/0147282 A1 | 5/2017 | Seo |
| 2017/0149890 A1 | 5/2017 | Shamis et al. |
| 2017/0187846 A1 | 6/2017 | Shalev et al. |
| 2017/0286322 A1 | 10/2017 | Garg et al. |
| 2017/0371591 A1 | 12/2017 | Xia et al. |
| 2018/0004690 A1 | 1/2018 | Kaminski et al. |
| 2018/0173643 A1 | 6/2018 | Yu et al. |
| 2018/0219976 A1 | 8/2018 | Decenzo et al. |
| 2018/0295052 A1* | 10/2018 | St-Laurent .............. H04L 47/34 |
| 2018/0357176 A1 | 12/2018 | Wang |
| 2019/0036893 A1 | 1/2019 | Jiang |
| 2019/0097938 A1 | 3/2019 | Talla et al. |
| 2019/0102303 A1 | 4/2019 | Wang et al. |
| 2019/0102568 A1 | 4/2019 | Hausauer et al. |
| 2019/0109714 A1 | 4/2019 | Clark et al. |
| 2019/0141041 A1 | 5/2019 | Bhabbur et al. |
| 2019/0147066 A1 | 5/2019 | Ben Dayan et al. |
| 2019/0147069 A1 | 5/2019 | Ben Dayan et al. |
| 2019/0213044 A1 | 7/2019 | Cui et al. |
| 2019/0253351 A1 | 8/2019 | Ihlar et al. |
| 2019/0303204 A1 | 10/2019 | Masputra et al. |
| 2019/0303221 A1 | 10/2019 | Masputra et al. |
| 2019/0303280 A1 | 10/2019 | Masputra et al. |
| 2019/0303576 A1 | 10/2019 | Masputra et al. |
| 2019/0306281 A1 | 10/2019 | Masputra et al. |
| 2020/0065244 A1 | 2/2020 | Sanghi et al. |

\* cited by examiner

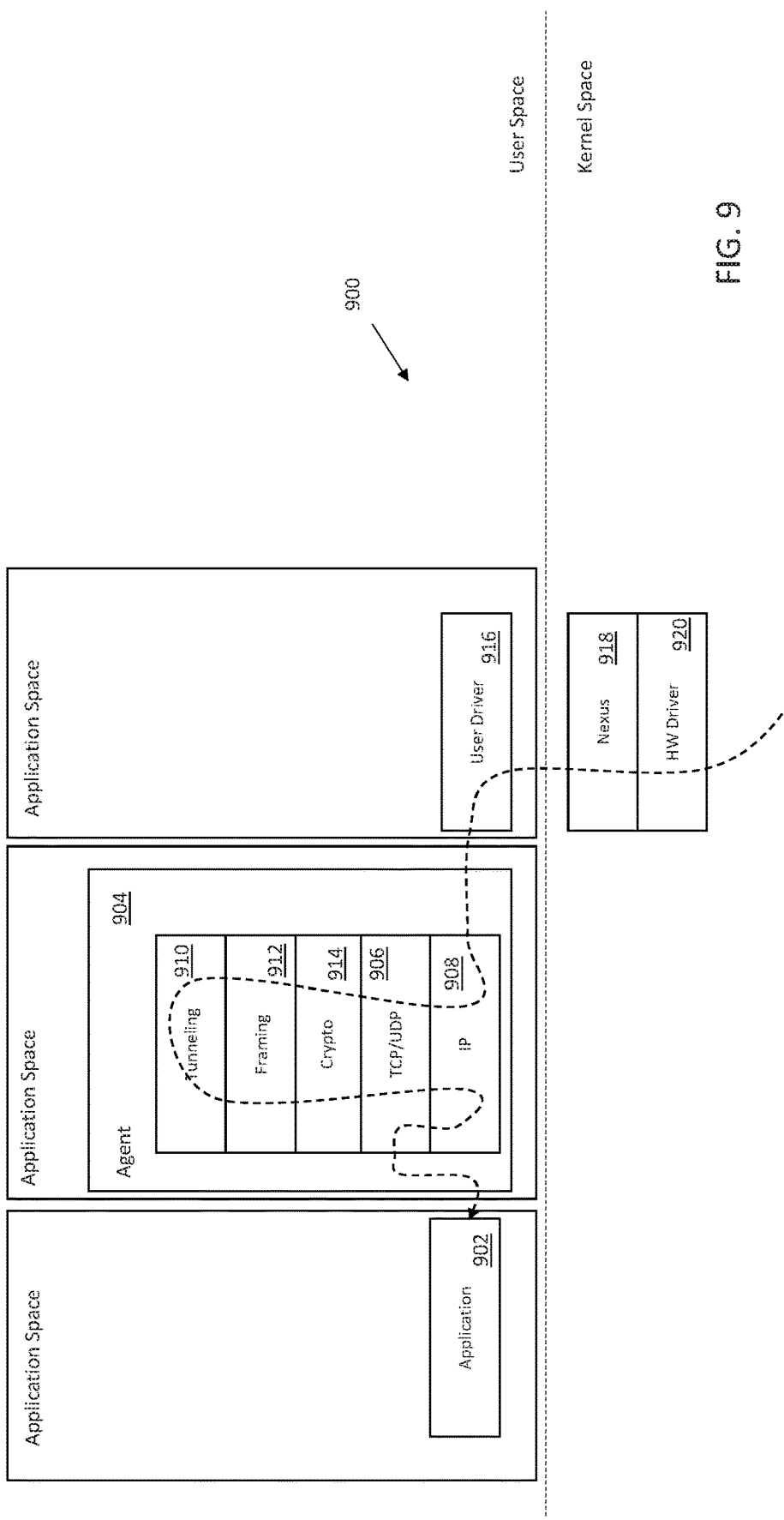

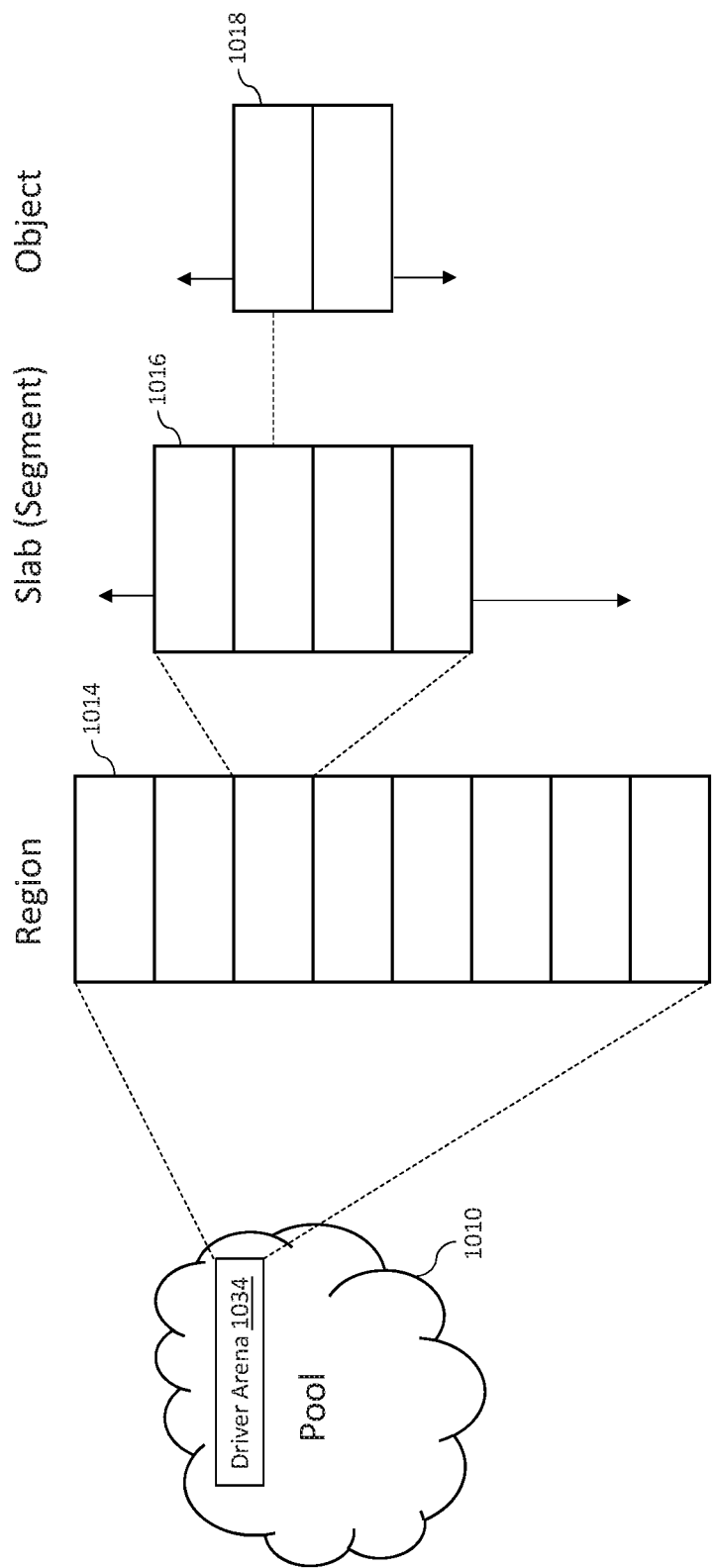

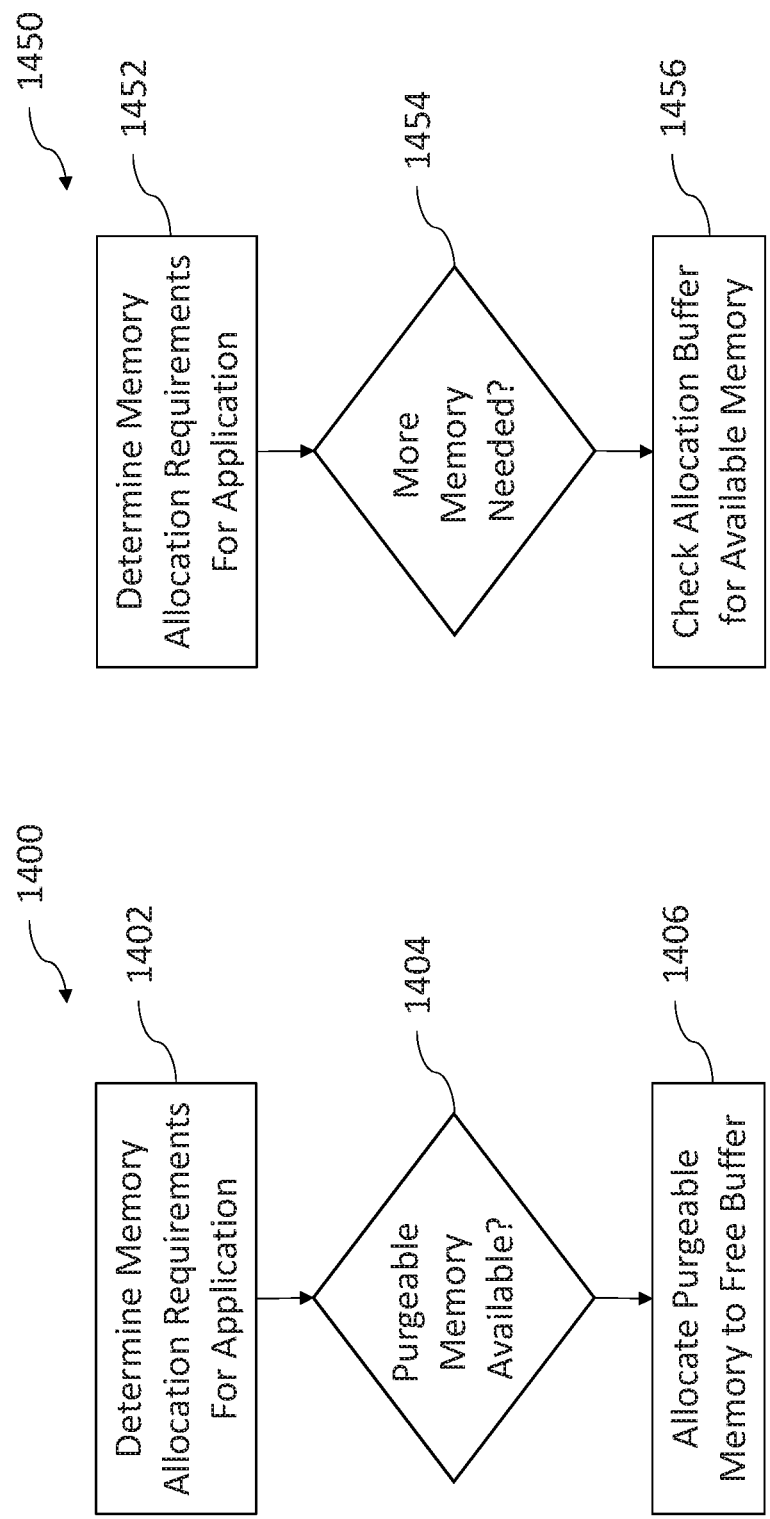

METHODS AND APPARATUS FOR DYNAMIC PACKET POOL CONFIGURATION IN NETWORKING STACK INFRASTRUCTURES

PRIORITY

This application claims the benefit of priority to U.S. Provisional Patent Application Ser. No. 62/649,509 filed Mar. 28, 2018 and entitled "Methods and Apparatus for Efficient Data Transfer within User Space Networking Stack Infrastructures", which is incorporated herein by reference in its entirety.

RELATED APPLICATIONS

This application is related to U.S. patent application Ser. No. 16/144,992 filed Sep. 27, 2018 and entitled "Methods and Apparatus for Single Entity Buffer Pool Management", U.S. patent application Ser. No. 16/146,533 filed Sep. 28, 2018 and entitled "Methods and Apparatus for Regulating Networking Traffic in Bursty System Conditions", U.S. patent application Ser. No. 16/146,324 filed Sep. 28, 2018 and entitled "Methods and Apparatus for Preventing Packet Spoofing with User Space Communication Stacks", U.S. patent application Ser. No. 16/146,916 filed Sep. 28, 2018 and entitled "Methods and Apparatus for Channel Defunct Within User Space Stack Architectures", and U.S. patent application Ser. No. 16/236,032 filed Dec. 28, 2018 and entitled "Methods and Apparatus for Classification of Flow Metadata with User Space Communication Stacks", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Technical Field

The disclosure relates generally to the field of electronic devices, as well as networks thereof. More particularly, the disclosure is directed to methods and apparatus for implementing computerized networking stack infrastructures. Various aspects of the present disclosure are directed to, in one exemplary aspect, data transfer within user space networking stack infrastructures.

2. Description of Related Technology

The consumer electronics industry has seen explosive growth in network connectivity; for example, Internet connectivity is now virtually ubiquitous across many different device types for a variety of different applications and functionalities. The successful implementation of network connectivity over a myriad of different usage cases has been enabled by, inter alia, the principles of modular design and abstraction. Specifically, the traditional network communication paradigm incorporates multiple (generally) modular software "layers" into a "communication stack." Each layer of the communication stack separately manages its own implementation specific considerations, and provides an "abstracted" communication interface to the next layer. In this manner, different applications can communicate freely across different devices without considering the underlying network transport.

The traditional network communication paradigm has been relatively stable for over 30 years. The Assignee hereof has developed its own implementation of a computer networking stack (based on the traditional networking paradigm) that is mature, robust, and feature-rich (yet conservative). This networking stack is the foundation for virtually all networking capabilities, including those used across the Assignee's products (e.g., MacBook®, iMac®, iPad®, Apple Watch®, Apple TV® and iPhone®, etc.) and has been designed to handle a variety of protocols (such as TCP (Transmission Control Protocol), UDP (User Datagram Protocol) and IP (Internet Protocol)), and proprietary extensions and functionalities.

While the traditional network communication paradigm has many benefits, changes in the commercial landscape have stretched the capabilities of the existing implementations. Over the past years new use cases have emerged that require capabilities beyond those of the traditional networking stack design. For example, some use cases require control and data movement operations to be performed in so-called "user space" (software that is executed outside the kernel, and specific to a user process). Common examples of such applications include without limitation e.g. Virtual Private Networks (VPN), application proxy, content and traffic filtering, and any number of other network-aware user applications.

Furthermore, certain types of user applications (e.g., media playback, real-time or interactive network applications) would benefit from workload-specific customizations and performance optimizations of the networking stack.

Unfortunately, the current one-size-fits-all networking stack was not designed for (and is thus ill-suited to) the requirements of the aforementioned use cases (and others contemplated herein). More directly, supporting user space applications and associated components from within the traditional in-kernel networking stack architecture adds complexity, increases technical debts (the implied cost of rework attributed to deploying a faster, but suboptimal, implementation), brings in higher processing costs, and results in suboptimal performance and higher power consumption.

To these ends, a networking stack architecture and technology that caters to emerging non-kernel use cases is needed. Ideally, but not as a requisite, such solutions should preserve backwards compatibility with the traditional in-kernel networking stack. More generally, improved methods and apparatus for manipulating and/or controlling lower layer networking communication protocols by higher layer software applications is desired.

SUMMARY

The present disclosure satisfies the foregoing needs by providing, inter alia, methods and apparatus for data transfer within user space networking stack infrastructures.

In one aspect, a system for managing pools of resources is disclosed. In one embodiment, the system includes one or more processor apparatus; a driver for use with one or more applications; physical memory for use by the driver and the one or more applications; and an input/output memory management unit (IOMMU) for use by the driver, the IOMMU configured to access a kernel virtual address (KVA), the KVA providing for translation of a virtual address accessed by the driver to a physical address associated with the physical memory. The one or more processor apparatus are configured to: determine memory allocation requirements for the driver; and determine whether purgeable memory associated with the driver is available, and when the purgeable memory associated with the driver is available, allocate the purgeable memory to a free buffer so that the purgeable memory may be allocated to other non-kernel space applications.

In one variant, the purgeable memory is associated with a transmission buffer and/or a receive buffer, each of the transmission buffer and/or the receive buffer being associated with the driver.

In another variant, the purgeable memory enables the transmission buffer and/or the receive buffer to be increased in size and/or be decreased in size.

In yet another variant, the one or more processor apparatus is further configured to: determine the memory allocation requirements for the driver; and when more memory is required to be allocated to the driver, check an allocation buffer for available memory resources to be allocated to the driver.

In yet another variant, each of the transmission buffer, the receive buffer, the free buffer, and the allocation buffer each consist of ring buffers.

In yet another variant, the driver is allocated an arena of memory resources within the physical memory, the arena of memory resources being exclusively assigned to the driver.

In yet another variant, the arena of memory resources that is exclusively assigned to the driver is further sub-divided into regions, each of the regions being further sub-divided into segments, each of the segments being further sub-divided into objects.

In yet another variant, the purgeable memory associated with the driver includes a first segment of the segments, the allocation of the purgeable memory to the free buffer occurs after all objects within the first segment have been freed.

In yet another variant, the purgeable memory includes a plurality of objects, each object of the plurality of objects being assigned to the free buffer in accordance with a prioritization scheme.

In yet another variant, the prioritization scheme includes an allocation of one or more objects of the plurality that has a higher level of priority than other ones of the objects of the plurality.

In yet another variant, determination of the higher level of priority is based on expected use of the one or more objects.

In yet another variant, determination of the higher level of priority is based on historical use of the one or more objects.

In yet another variant, the prioritization scheme includes an ordering of the plurality of objects based on an order of arrival for the plurality of objects.

In yet another variant, a portion of the other non-kernel space applications include user-space applications.

In yet another variant, another portion of the other non-kernel space applications includes other drivers.

In another aspect, a method of arranging a memory architecture associated with a non-kernel space application is disclosed. In one embodiment, the method includes assigning a pool of memory resources to the non-kernel space application; splitting the pool of memory resources into a device accessible portion and a kernel accessible portion; and enabling the non-kernel space application to access the device accessible portion while disabling the non-kernel space application from accessing the kernel accessible portion.

In one variant, the method further includes assigning a packet buffer region to the device accessible portion; and assigning metadata structures associated with the packet buffer region to the kernel accessible portion.

In another variant, the method further includes providing an input/output memory management unit (IOMMU) for the non-kernel space application; and only mapping the device accessible portion to the IOMMU.

In yet another aspect, a method of arranging a memory architecture associated with a non-kernel space application is disclosed. In one embodiment, the method includes allocating a pool of memory resources to the non-kernel space application, the pool of memory resources being backed by physical addresses in memory, the physical addresses in memory comprising a plurality of pages of memory; splitting the pool of memory resources into a plurality of regions; and splitting the plurality of regions into a plurality of segments such that each segment includes a size that is an integer multiple of a size of a page of memory of the plurality of pages of memory.

In one variant, the method further includes using a single input/output (I/O) bus address lookup for a given segment of the plurality of segments; and caching the single I/O bus address lookup within the given segment of the plurality of segments.

In yet another aspect, methods and apparatus for driver managed pool are disclosed. In one embodiment, a system global packet buffer pool is obviated in favor of a packet buffer pool managed and owned by a driver that can be dedicated for that driver, or shared among several drivers. The owner of the pool handles notifications to dynamically map and un-map the pool's memory from its device IOMMU aperture. This same notification can also "wire/un-wire" the memory as needed. Read and write attributes can also be restricted on both the host and the device side based on the I/O transfer direction for added security.

In yet another aspect, methods and apparatus for multi-buflet descriptors (array) are disclosed. In one embodiment, jumbo frames are supported in a memory efficient manner; rather than always allocating enough memory to hold the largest possible frame size, a packet can instead hold an array of buflets, each buflet points to a fixed size block of memory allocated from a pool. The binding between the buflets and a packet can be formed on demand. This scheme allows, inter alia, a packet to have a variable number of buflets depending on the size of the payload. This also makes it easier to support scatter-gather style DMA engines by handing it buflets, which are uniform by nature.

In yet another aspect, methods and apparatus for segment-based IOMMU mapping are disclosed. In one embodiment, use of a look-up of an I/O bus address is at least partly obviated in favor of use a memory segment which is guaranteed to be a multiple of a page size as the smallest memory unit for I/O mappings. Each memory segment is then divided into several packet buffers. Only one I/O bus address lookup is required for all the packet buffers within that segment, and this I/O bus address can also be cached within the segment object.

In yet another aspect, methods and apparatus for split metadata and buffer management are disclosed. In one embodiment, exposing packet metadata to the hardware such as Wi-Fi chips and cellular baseband is obviated in favor of use of different memory regions for the packet metadata and the packet buffers to prevent malicious hardware from accessing the packet metadata. In one variant, only the packet buffers are I/O mapped and visible to the device.

In yet another aspect, methods and apparatus for a user packet pool are disclosed. In one embodiment, an efficient scheme is provided that enables dynamic scale-up and down of a memory available to each process according to the current throughput requirements. A user packet pool is used in one variant to achieve this; it attempts to reuse the efficient packet I/O mechanism to move memory buffers across kernel-user boundary and utilizes channel synchronization statistics to dynamically scale the amount of memory available to each channel.

In yet another aspect, a computerized device implementing one or more of the foregoing aspects is disclosed and described. In one embodiment, the device includes a personal or laptop computer. In another embodiment, the device includes a mobile device (e.g., tablet or smartphone).

In yet another aspect, an integrated circuit (IC) device implementing one or more of the foregoing aspects is disclosed and described. In one embodiment, the IC device is embodied as a System on Chip (SoC) device. In another embodiment, an application-specific integrated circuit (ASIC) is used as the basis of the device. In yet another embodiment, a chip set (i.e., multiple ICs used in coordinated fashion) is disclosed.

In another aspect, a computer readable storage apparatus implementing one or more of the foregoing aspects is disclosed and described. In one embodiment, the computer readable apparatus comprises a program memory, or an EEPROM. In another embodiment, the apparatus includes a solid state drive (SSD) or other mass storage device. In another embodiment, the apparatus comprises a USB or other "flash drive" or other such portable removable storage device. In yet another embodiment, the apparatus comprises a "cloud" (network) based storage device which is remote from yet accessible via a computerized user or client electronic device.

In yet another aspect, a software architecture for implementing one or more of the foregoing aspects is disclosed and described. In one embodiment, the architecture includes both user space and kernel space, separated via a software or virtual partition.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 9 is a logical flow diagram useful to summarize an exemplary proxy agent application within the context of the user space networking stack, in accordance with various aspects of the present disclosure.

FIGS. 10A-10C are logical block diagrams of an exemplary implementation of a packet pool for a non-kernel space application, in accordance with various aspects of the present disclosure.

FIG. 14A is a generalized method for the allocation of purgeable memory to a free buffer, in accordance with various aspects of the present disclosure.

FIG. 14B is a generalized method for the checking of an allocation buffer for available memory resources, in accordance with various aspects of the present disclosure.

All figures © Copyright 2017-2019 Apple Inc. All rights reserved.

DETAILED DESCRIPTION

Figure 1:
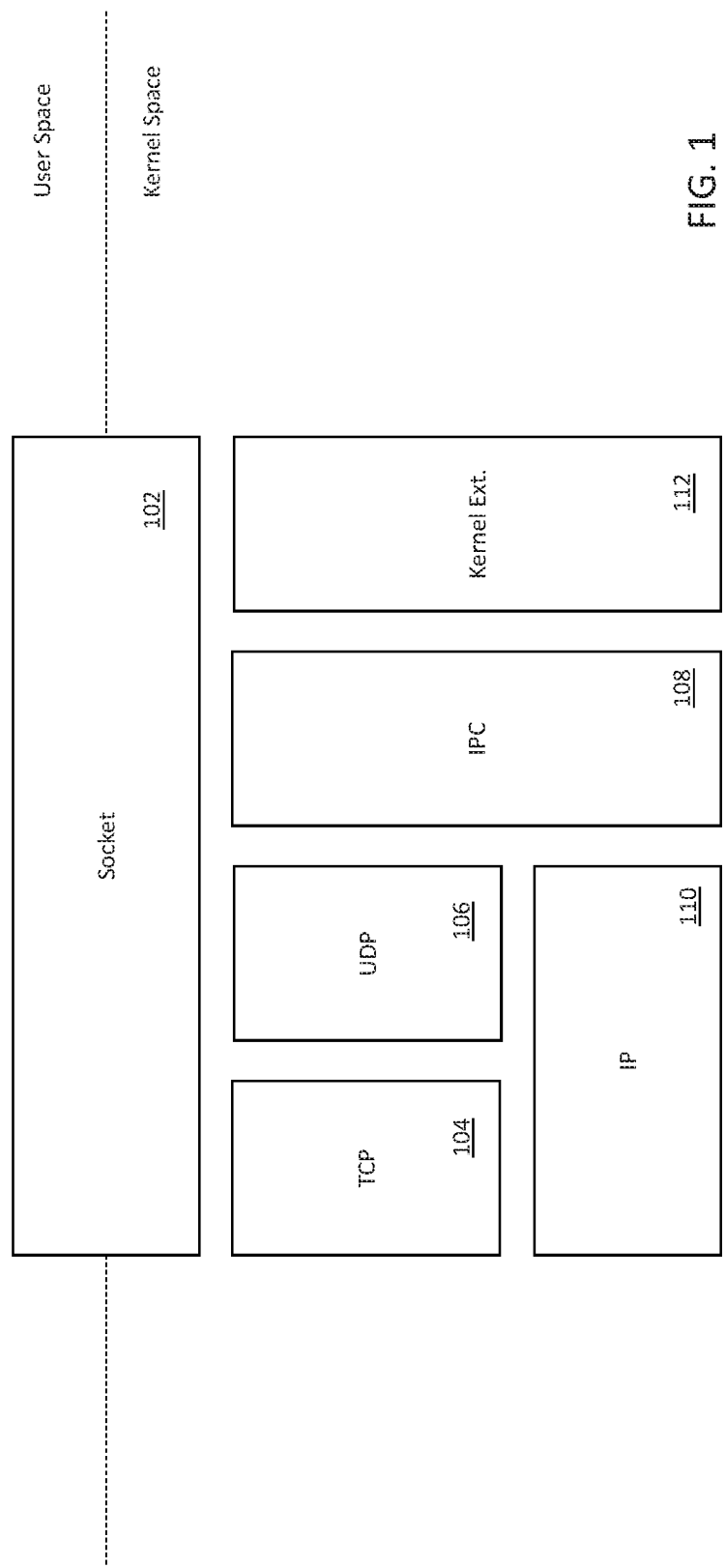
FIG. 1 is a logical representation of a traditional network socket, useful for explaining various aspects of the present disclosure.

Reference is now made to the drawings, wherein like numerals refer to like parts throughout.
Detailed Description of Exemplary Embodiments Exemplary embodiments of the present disclosure are now described in detail. While embodiments are primarily discussed in the context of use in conjunction with an inter-processor communication (IPC) link such as that described in, for example, commonly owned U.S. patent application Ser. No. 14/879,024 filed Oct. 8, 2015 and entitled "METHODS AND APPARATUS FOR RUNNING AND BOOTING AN INTER-PROCESSOR COMMUNICATION LINK BETWEEN INDEPENDENTLY OPERABLE PROCESSORS", now U.S. Pat. No. 10,078,361, and co-owned and co-pending U.S. patent application Ser. No. 16/112,480 filed Aug. 24, 2018 and entitled "METHODS AND APPARATUS FOR CONTROL OF A JOINTLY SHARED MEMORY-MAPPED REGION", each of which being incorporated herein by reference in its entirety, it will be recognized by those of ordinary skill that the present disclosure is not so limited.
Existing Network Socket Technologies FIG. 1 illustrates one logical representation of a traditional network socket 102, useful for explaining various aspects of the traditional networking interface. A network "socket" is a virtualized internal network endpoint for sending or receiving data at a single node in a computer network. A network socket may be created ("opened") or destroyed ("closed") and the manifest of network sockets may be stored as entries in a network resource table which may additionally include reference to various communication protocols (e.g., Transmission Control Protocol (TCP) 104, User Datagram Protocol (UDP) 106, Inter-Processor Communication (IPC) 108, etc.), destination, status, and any other operational processes (kernel extensions 112) and/or parameters); more generally, network sockets are a form of system resource.

As shown in FIG. 1, the socket 102 provides an application programming interface (API) that spans between the user space and the kernel space. An API is a set of clearly defined methods of communication between various software components. An API specification commonly includes, without limitation: routines, data structures, object classes, variables, remote calls and/or any number of other software constructs commonly defined within the computing arts.

As a brief aside, user space is a portion of system memory that a processor executes user processes from. User space is relatively freely and dynamically allocated for application software and a few device drivers. The kernel space is a portion of memory that a processor executes the kernel from. Kernel space is strictly reserved (usually during the processor boot sequence) for running privileged operating system (O/S) processes, extensions, and most device drivers. For example, each user space process normally runs in a specific memory space (its own "sandbox"), and cannot access the memory of other processes unless explicitly allowed. In contrast, the kernel is the core of a computer's operating system; the kernel can exert complete control over all other processes in the system.

The term "operating system" may refer to software that controls and manages access to hardware. An O/S commonly supports processing functions such as e.g., task scheduling, application execution, input and output management, memory management, security, and peripheral access. As used herein, the term "application" refers to software that can interact with the hardware only via procedures and interfaces offered by the O/S.

The term "privilege" may refer to any access restriction or permission which restricts or permits processor execution. System privileges are commonly used within the computing arts to, inter alia, mitigate the potential damage of a computer security vulnerability. For instance, a properly privileged computer system will prevent malicious software applications from affecting data and task execution associated with other applications and the kernel.

As used herein, the term "in-kernel" and/or "kernel space" may refer to data and/or processes that are stored in, and/or have privilege to access to, the kernel space memory allocations. In contrast, the terms "non-kernel" and/or "user space" refers to data and/or processes that are not privileged to access the kernel space memory allocations. In particular, user space represents the address space specific to the user process, whereas non-kernel space represents address space which is not in-kernel, but which may or may not be specific to user processes.

As previously noted, the illustrated socket 102 provides access to Transmission Control Protocol (TCP) 104, User Datagram Protocol (UDP) 106, and Inter-Processor Communication (IPC) 108. TCP, UDP, and IPC are various suites of transmission protocols each offering different capabilities and/or functionalities. For example, UDP is a minimal message-oriented encapsulation protocol that provides no guarantees to the upper layer protocol for message delivery and the UDP layer retains no state of UDP messages once sent. UDP is commonly used for real-time, interactive applications (e.g., video chat, voice over IP (VoIP)) where loss of packets is acceptable. In contrast, TCP provides reliable, ordered, and error-checked delivery of data via a retransmission and acknowledgement scheme; TCP is generally used for file transfers where packet loss is unacceptable, and transmission latency is flexible.

As used herein, the term "encapsulation protocol" may refer to modular communication protocols in which logically separate functions in the network are abstracted from their underlying structures by inclusion or information hiding within higher level objects. For example, in one exemplary embodiment, UDP provides extra information (ports numbering).

As used herein, the term "transport protocol" may refer to communication protocols that transport data between logical endpoints. A transport protocol may include encapsulation protocol functionality.

Both TCP and UDP are commonly layered over an Internet Protocol (IP) 110 for transmission. IP is a connectionless protocol for use on packet-switched networks that provides a "best effort delivery". Best effort delivery does not guarantee delivery, nor does it assure proper sequencing or avoidance of duplicate delivery. Generally these aspects are addressed by TCP or another transport protocol based on UDP.

As a brief aside, consider a web browser that opens a webpage; the web browser application would generally open a number of network sockets to download and/or interact with the various digital assets of the webpage (e.g., for a relatively common place webpage, this could entail instantiating ~300 sockets). The web browser can write (or read) data to the socket; thereafter, the socket object executes system calls within kernel space to copy (or fetch) data to data structures in the kernel space.

As used herein, the term "domain" may refer to a self-contained memory allocation e.g., user space, kernel space. A "domain crossing" may refer to a transaction, event, or process that "crosses" from one domain to another domain. For example, writing to a network socket from the user space to the kernel space constitutes a domain crossing access.

In the context of a Berkeley Software Distribution (BSD) based networking implementation, data that is transacted within the kernel space is stored in memory buffers that are also commonly referred to as "mbufs". Each mbuf is a fixed size memory buffer that is used generically for transfers (mbufs are used regardless of the calling process e.g., TCP, UDP, etc.). Arbitrarily sized data can be split into multiple mbufs and retrieved one at a time or (depending on system support) retrieved using "scatter-gather" direct memory access (DMA) ("scatter-gather" refers to the process of gathering data from, or scattering data into, a given set of buffers). Each mbuf transfer is parameterized by a single identified mbuf.

Notably, each socket transfer can create multiple mbuf transfers, where each mbuf transfer copies (or fetches) data from a single mbuf at a time. As a further complication, because the socket spans both: (i) user space (limited privileges) and (ii) kernel space (privileged without limitation), the socket transfer verifies that each mbuf copy into/out of kernel space is valid. More directly, the verification process ensures that the data access is not malicious, corrupted, and/or malformed (i.e., that the transfer is appropriately sized and is to/from an appropriate area).

The processing overhead associated with domain crossing is a non-trivial processing cost. Processing cost affects user experience both directly and indirectly. A processor has a fixed amount of processing cycles every second; thus cycles that are used for transfer verification detract from more user perceptible tasks (e.g., rendering a video or audio stream).

Additionally, processor activity consumes power; thus, increases in processing overhead increases power consumption.

Referring back to FIG. 1, in addition to the generic TCP 104, UDP 106, and IPC 108 communication suites, the illustrated socket 102 also may provide access to various kernel extensions 112. A kernel extension is a dynamically loaded bundle of executable code that executes from kernel space. Kernel extensions may be used to perform low-level tasks that cannot be performed in user space. These low-level tasks typically fall into one or more of: low-level device drivers, network filters, and/or file systems. Examples of sockets and/or extensions include without limitation: route (IP route handling), ndrv (packet 802.1X handling), key (key management), unix (translations for Unix systems), kernel control, kernel events, parental controls, intrusion detection, content filtering, hypervisors, and/or any number of other kernel tasking.

Kernel extensions and public APIs enable, for example, $3^{rd}$ party software developers to develop a wide variety of applications that can interact with a computer system at even the lowest layers of abstraction. For example, kernel extensions can enable socket level filtering, IP level filtering, and even device interface filtering. In the current consumer applications space, many emerging technologies now rely on closely coupled interfaces to the hardware and kernel functionality. For example, many security applications "sniff" network traffic to detect malicious traffic or filter undesirable content; this requires access to other application sandboxes (a level of privilege that is normally reserved for the kernel).

Unfortunately, $3^{rd}$ party kernel extensions can be dangerous and/or undesirable. As previously noted, software applications are restricted for security and stability reasons; however the kernel is largely unrestricted. A $3^{rd}$ party kernel extension can introduce instability issues because the $3^{rd}$ party kernel extensions run in the same address space as the kernel itself (which is outside the purview of traditional memory read/write protections based on memory allocations). Illegal memory accesses can result in segmentation faults and memory corruptions. Furthermore, unsecure kernel extension can create security vulnerabilities that can be exploited by malware. Additionally, even where correctly used, a kernel extension can expose a user's data to the $3^{rd}$ party software developer. This heightened level of access may raise privacy concerns (e.g., the $3^{rd}$ party developer may have access to browsing habits, etc.).

Existing Performance Optimization Technologies

Figure 2:
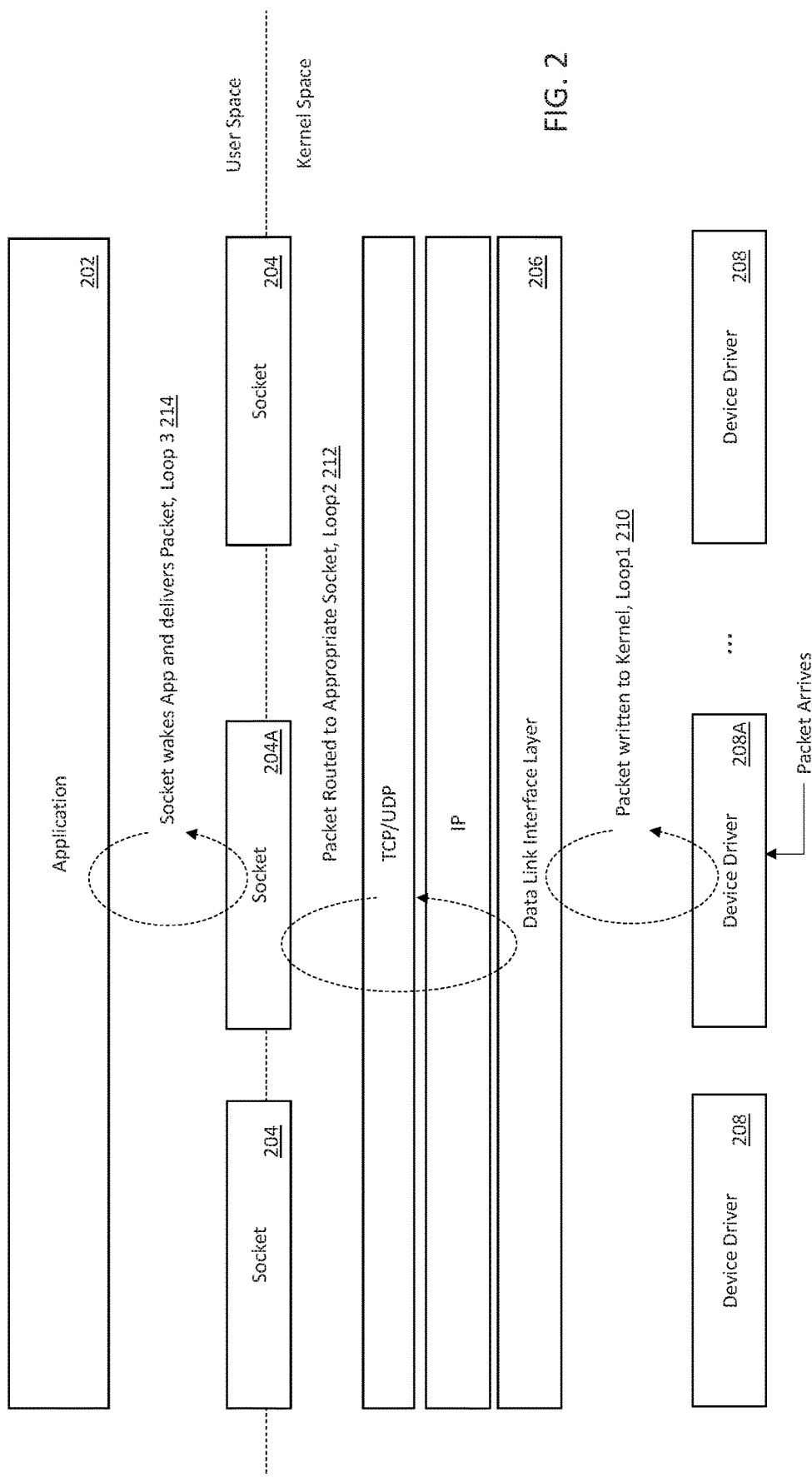
FIG. 2 is a logical representation of a computer system that implements Input/Output (I/O) network control, useful for explaining various aspects of the present disclosure.

FIG. 2 illustrates one logical representation of a computer system that implements Input/Output (I/O) network control, useful for explaining various aspects of traditional network optimization. As depicted therein, a software application 202 executing from user space opens multiple sockets 204 to communicate with e.g., a web server. Each of the sockets interfaces with a Data Link Interface Layer (DLIL) 206.

The DLIL 206 provides a common interface layer to each of the various physical device drivers which will handle the subsequent data transfer (e.g., Ethernet, Wi-Fi, cellular, etc.). The DLIL performs a number of system-wide holistic network traffic management functions. In one such implementation, the DLIL is responsible for BSD Virtual Interfaces, IOKit Interfaces (e.g., DLIL is the entity by which IOKit based network drivers are connected to the networking stack), Active Queue Management (AQM), flow control and advisory action, etc. In most cases, the device driver 208 may be handled by an external device (e.g., a baseband co-processor), thus the DLIL 206 is usually (but not always) the lowest layer of the network communication stack.

During normal operation, the computer system will logically segment its tasks to optimize overall system operation. In particular, a processor will execute a task, and then "context switch" to another task, thereby ensuring that any single process thread does not monopolize processor resources from start to finish. More directly, a context switch is the process of storing the state of a process, or of a thread, so that it can be restored and execution resumed from the same point later. This allows multiple processes to share a single processor. However, excessive amounts of context switching can slow processor performance down. Notably, while the present discussion is primarily discussed within the context of a single processor for ease of understanding, multi-processor systems have analogous concepts (e.g., multiple processors also perform context switching, although contexts may not necessarily be resumed by the same processor).

For example, consider the following example of a packet reception. Packets arrive at the device driver 208A. The hardware managed by the device driver 208A may notify the processor via e.g., a doorbell signal (e.g., an interrupt). The device driver 208A work loop thread handles the hardware interrupt/doorbell, then signals the DLIL thread (Loop 1 210). The processor services the device driver 208A with high priority, thereby ensuring that the device driver 208A operation is not bottlenecked (e.g., that the data does not overflow the device driver's memory and/or that the device driver does not stall). Once the data has been moved out of the device driver, the processor can context switch to other tasks.

At a later point, the processor can pick up the DLIL 206 execution process again. The processor determines which socket the packets should be routed to (e.g., socket 204A) and routes the packet data appropriately (Loop 2 212). During this loop, the DLIL thread takes each packet, and moves each one sequentially into the socket memory space. Again, the processor can context switch to other tasks so as to ensure that the DLIL task does not block other concurrently executed processing.

Subsequently thereafter, when the socket has the complete packet data transfer the processor can wake the user space application and deliver the packet into user space memory (Loop 3 214). Generally, user space applications are treated at lower priority than kernel tasks; this can be reflected by larger time intervals between suspension and resumption. While the foregoing discussion is presented in the context of packet reception, artisans of ordinary skill in the related arts will readily appreciate, given the contents of the present disclosure, that the process is substantially reversed for packet transmission.

As demonstrated in the foregoing example, context switching ensures that tasks of different processing priority are allocated commensurate amounts of processing time. For example, a processor can spend significantly more time executing tasks of relatively high priority, and service lower priority tasks on an as-needed basis. As a brief aside, human perception is much more forgiving than hardware operation. Consequently, kernel tasks are generally performed at a much higher priority than user space applications. The difference in priority between kernel and user space allows the kernel to handle immediate system management (e.g., hardware interrupts, and queue overflow) in a timely manner, with minimal noticeable impact to the user experience.

Moreover, FIG. 2 is substantially representative of every implementation of the traditional network communications stack. While implementations may vary from this illustrative example, virtually all networking stacks share substantially the same delivery mechanism. The traditional network communications stack schema (such as the BSD architecture and derivatives therefrom) have been very popular for the past 30 years due to its relative stability of implementation and versatility across many different device platforms. For example, the Assignee hereof has developed and implemented the same networking stack across virtually all of its products (e.g., MacBook®, iMac®, iPad®, and iPhone®, Apple Watch®, etc.).

Unfortunately, changing tastes in consumer expectations cannot be effectively addressed with the one-size-fits-all model and the conservative in-kernel traditional networking stack. Artisans of ordinary skill in the related arts will readily appreciate, given the contents of the present disclosure, that different device platforms have different capabilities; for example, a desktop processor has significantly more processing and memory capability than a mobile phone processor. More directly, the "one-size-fits-all" solution does not account for the underlying platform capabilities and/or application requirements, and thus is not optimized for performance. Fine-tuning the traditional networking stack for performance based on various "tailored" special cases results in an inordinate amount of software complexity which is untenable to support across the entire ecosystem of devices.

Emerging Use Cases

Figure 3:
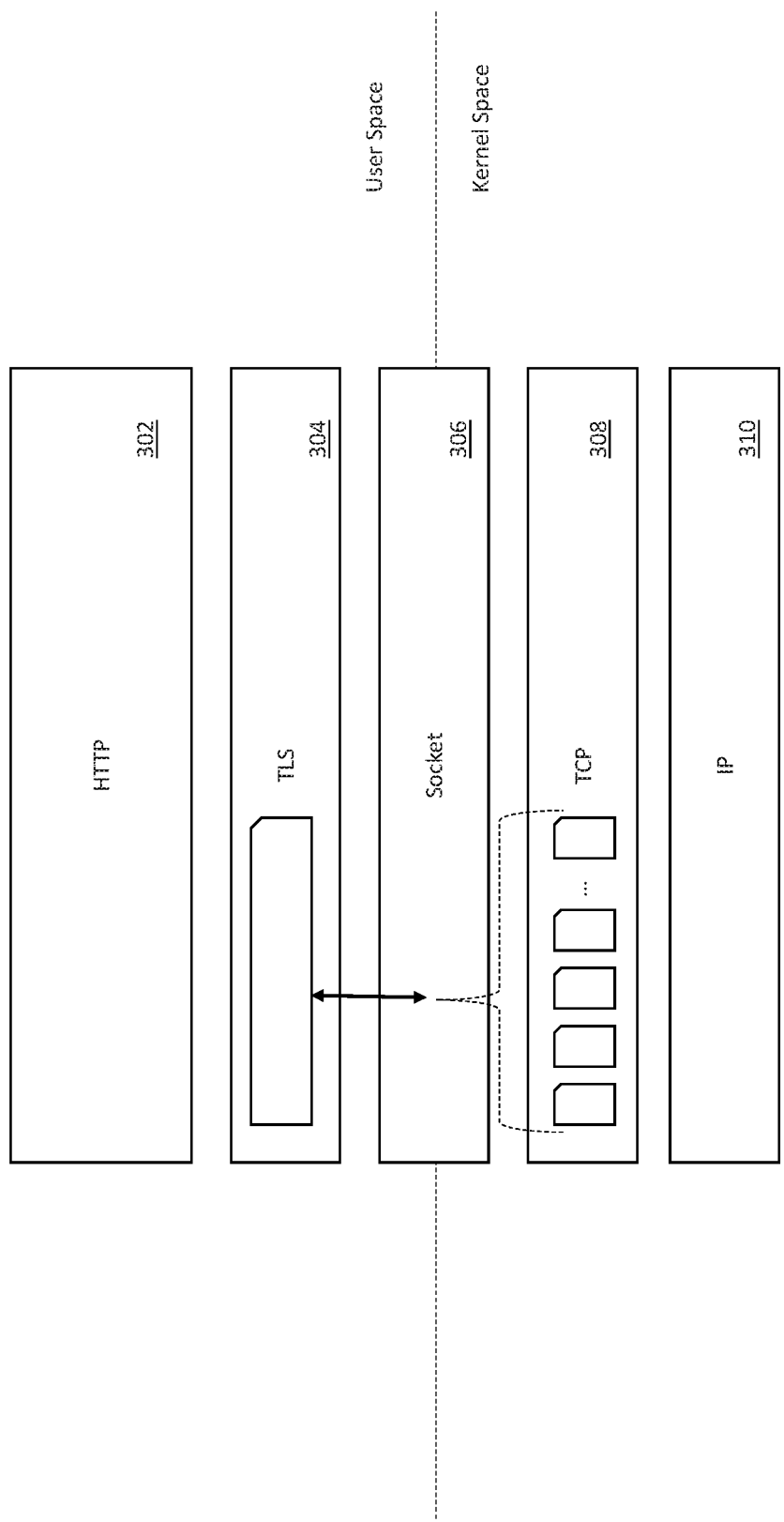
FIG. 3 is a logical block diagram of one exemplary implementation of Transport Layer Security (TLS), useful for explaining various aspects of the present disclosure.

FIG. 3 illustrates a logical block diagram of one exemplary implementation of Transport Layer Security (TLS) (the successor to Secure Sockets Layer (SSL)), useful to explain user/kernel space integration complexities of emerging use cases.

As shown, an application executing from user space can open a Hypertext Transfer Protocol (HTTP) session 302 with a TLS security layer 304 in order to securely transfer data (Application Transport Security (ATS) services) over a network socket 306 that offers TCP/IP transport 308, 310.

As a brief aside, TLS is a record based protocol; in other words, TLS uses data records which are arbitrarily sized (e.g., up to 16 kilobytes). In contrast, TCP is a byte stream protocol (i.e., a byte has a fixed length of eight (8) bits). Consequently, the TCP layer subdivides TLS records into a sequentially ordered set of bytes for delivery. The receiver of the TCP byte stream reconstructs TLS records from the TCP byte stream by receiving each TCP packet, re-ordering the packets according to sequential numbering to recreate the byte stream, and extracting the TLS record from the aggregated byte stream. Notably, every TCP packet of the sequence must be present before the TLS record can be reconstructed. Even though TCP can provide reliable delivery under lossy network conditions, there are a number of situations where TLS record delivery could fail. For example, under ideal conditions TCP isolates packet loss from its client (TLS in this example), and a single TCP packet loss should not result in failed TLS record delivery. However, the TLS layer or the application above may incorporate a timeout strategy in a manner that is unaware of the underlying TCP conditions. Thus, if there's significant packet loss in the network, the TLS timeout may be hit (and thus result in a failure to the application) even though TCP would normally provide reliable delivery.

Referring back to FIG. 3, virtually every modern operating system executes TLS from user space when e.g., securely connecting to other network entities, inter alia, a web browser instance and a server. But existing implementations of TLS are not executed from the kernel (or other privileged software layer) due to e.g., the complexity of error handling within the kernel. However, as a practical matter, TLS would operate significantly better with information regarding the current networking conditions (held in the kernel).

Ideally, the TLS layer should set TLS record sizes based on network condition information. In particular, large TLS records can efficiently use network bandwidth, but require many successful TCP packet deliveries. In contrast, small TLS records incur significantly more network overhead, but can survive poor bandwidth conditions. Unfortunately, networking condition information is lower layer information that is available to the kernel space (e.g., the DLIL and device drivers), but generally restricted from user space applications. Some $3^{rd}$ party application developers and device manufacturers have incorporated kernel extensions (or similar operating system capabilities) to provide network condition information to the TLS user space applications; however, kernel extensions are undesirable due to the aforementioned security and privacy concerns. Alternately, some $3^{rd}$ party applications infer the presence of lossy network conditions based on historic TLS record loss. Such inferences are an indirect measure and significantly less accurate and lag behind real-time information (i.e., previous packet loss often does not predict future packet loss).

Figure 4:
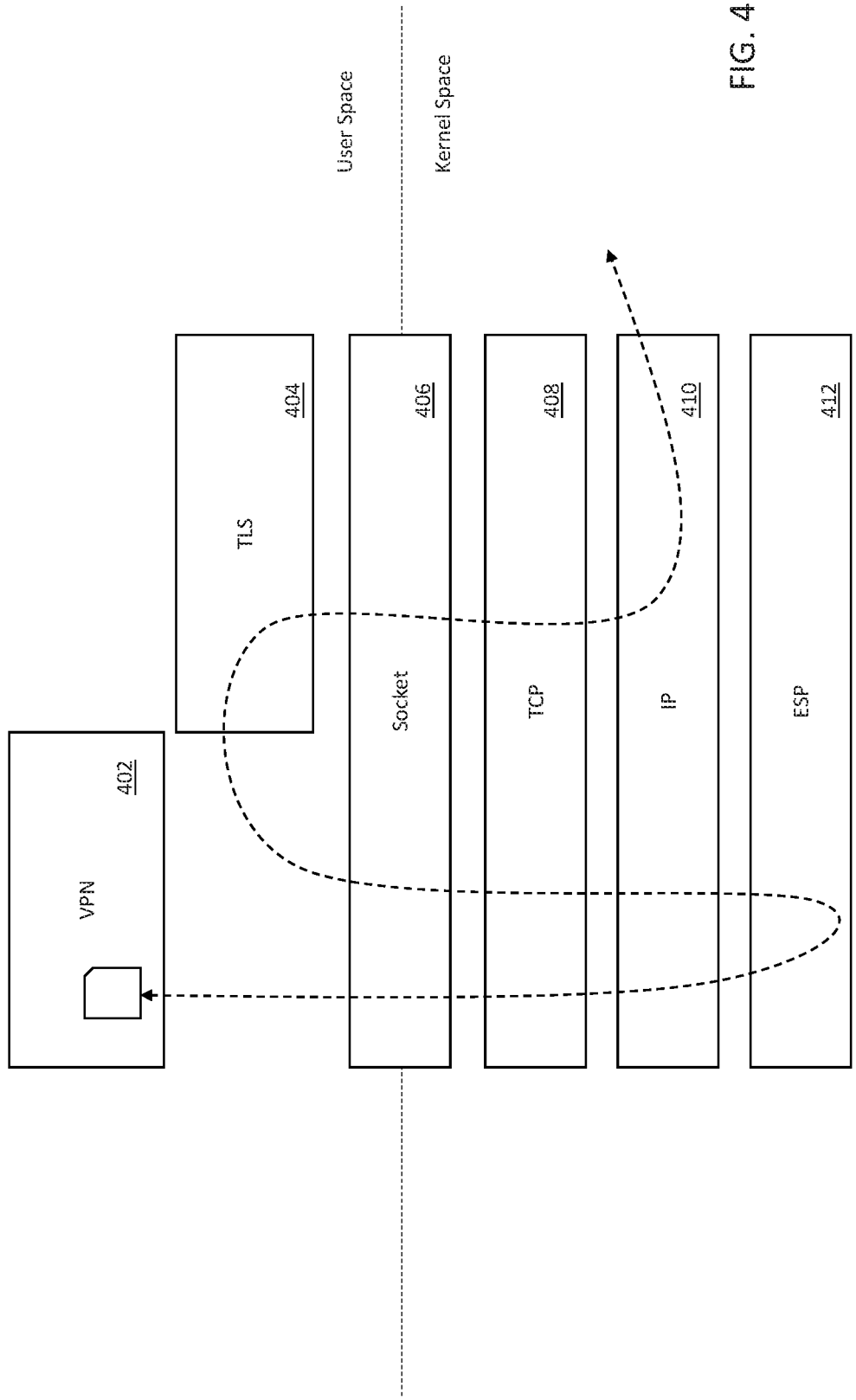
FIG. 4 is a logical block diagram of an exemplary implementation of a Virtual Private Network (VPN), useful for explaining various aspects of the present disclosure.

FIG. 4 illustrates a logical block diagram of an exemplary implementation of a Virtual Private Network (VPN), useful to explain recursive/cross-layer protocol layer complexities of emerging use cases.

As shown, an application executing from user space can open a Virtual Private Network (VPN) session 402 over a network socket 406 that offers TCP/IP transport 408, 410. The VPN session is secured with Encapsulating Security Protocol (ESP) 412. The encrypted packet is securely tunneled via TLS 404 (in user space) and recursively sent again over TCP/IP transport 408, 410.

As illustrated within FIG. 4, the exemplary VPN tunnel starts in user space, crosses into kernel space, returns back to user space, and then crosses back into kernel space before being transferred. Each of the domain crossings results in costly context switches and data shuffling both of which are processor intensive and inefficient. More directly, every time data traverses from user space to kernel space, the data must be validated (which takes non-trivial processing time). Additionally, context switching can introduce significant latency while the task is suspended.

Artisans of ordinary skill in the related arts, given the contents of the present disclosure, will readily appreciate that the exemplary recursive cross layer transaction of FIG. 4 is merely illustrative of a broad range of applications which use increasingly exotic protocol layer compositions. For example, applications that traverse the application proxy/agent data path commonly require tunneling TCP (kernel space) over application proxy/agent data path (user space) over UDP/IP (kernel space). Another common implementation is IP (kernel space) over Quick UDP Internet Connections (QUIC) (user space) over UDP/IP (kernel space).

Figure 5:
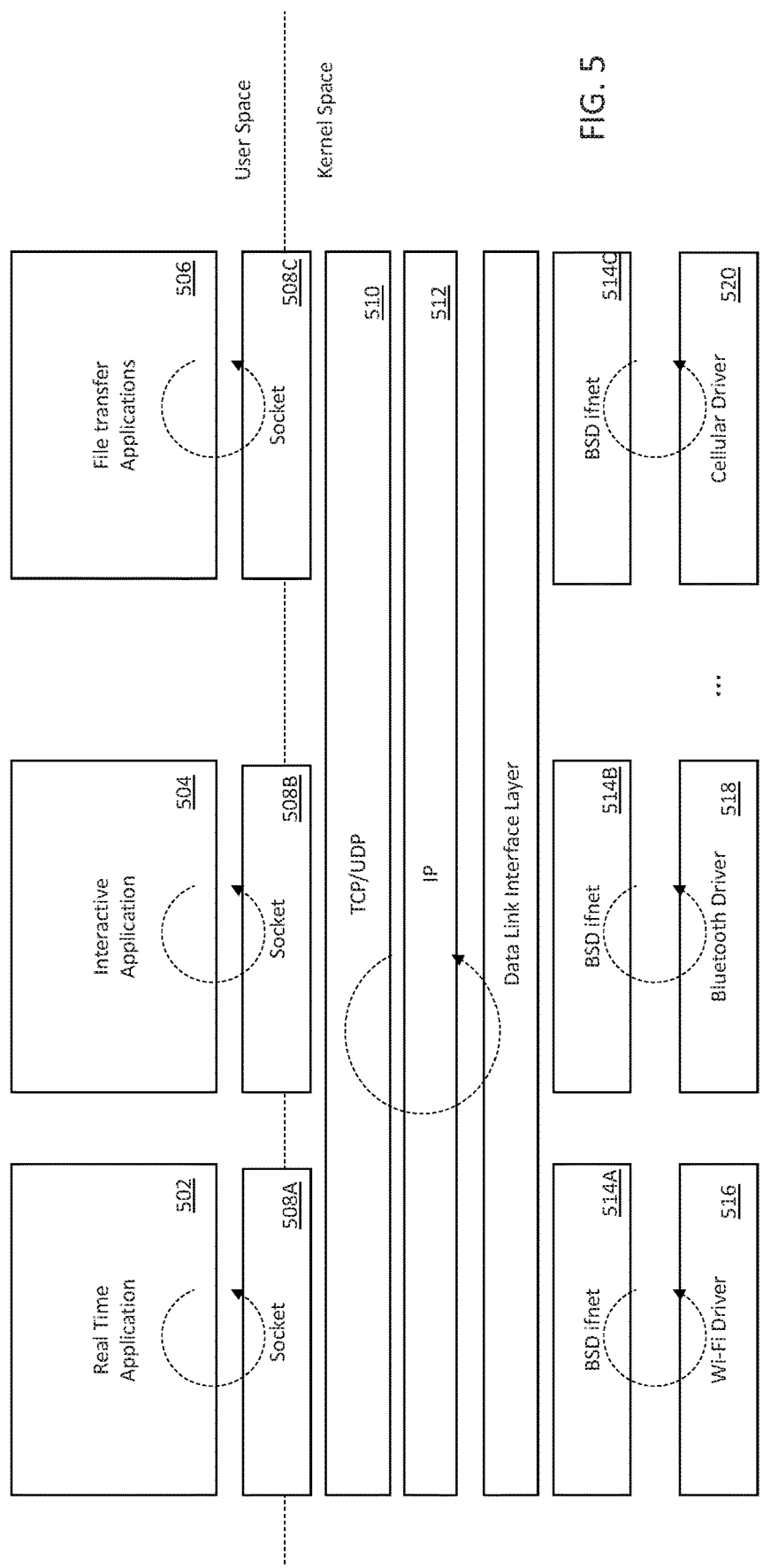
FIG. 5 is a logical block diagram of an exemplary implementation of application based tuning, useful for explaining various aspects of the present disclosure.

FIG. 5 illustrates a logical block diagram of an exemplary implementation of application based tuning, useful to explain various other workload optimization complexities of emerging use cases.

As shown, three (3) different concurrently executed applications (e.g., a real time application 502, interactive application 504, and file transfer applications 506) in user space, each open a session over network sockets 508 (508A, 508B, 508C) that offer TCP/UDP/IP transport 510/512. Depending on the type of physical interface required, the sessions are switched to BSD network interfaces (ifnet) 514 (514A, 514B, 514C) which handle the appropriate technology. Three different illustrated technology drivers are shown: Wi-Fi 516, Bluetooth 518, and cellular 520.

It is well understood within the networking arts that different application types are associated with different capabilities and requirements. One such example is real time applications 502, commonly used for e.g., streaming audio/visual and/or other "live" data. Real time data has significant latency and/or throughput restrictions; moreover, certain real time applications may not require (and/or support) retransmission for reliable delivery of lost or corrupted data. Instead, real time applications may lower bandwidth requirements to compensate for poor transmission quality (resulting in lower quality, but timely, delivered data).

Another such example is interactive applications 504, commonly used for e.g., human input/output. Interactive data should be delivered at latencies that are below the human perceptible threshold (within several milliseconds) to ensure that the human experience is relatively seamless. This latency interval may be long enough for a retransmission, depending on the underlying physical technology. Additionally, human perception can be more or less tolerant of certain types of data corruptions; for example, audio delays below 20 ms are generally imperceptible, whereas audio corruptions (pops and clicks) are noticeable. Consequently, some interactive applications may allow for some level of error correction and/or adopt less aggressive bandwidth management mechanisms depending on the acceptable performance requirements for human perception.

In contrast to real time applications and interactive applications, file transfer applications 506 require perfect data fidelity without latency restrictions. To these ends, most file transfer technologies support retransmission of lost or corrupted data, and retransmission can have relatively long attempt intervals (e.g., on the order of multiple seconds to a minute).

Similarly, within the communication arts, different communication technologies are associated with different capabilities and requirements. For example, Wi-Fi 516 (wireless local area networking based on IEEE 802.11) is heavily based on contention based access and is best suited for high bandwidth deliveries with reasonable latency. Wi-Fi is commonly used for file transfer type applications. Bluetooth 518 (personal area networking) is commonly used for low data rate and low latency applications. Bluetooth is commonly used for human interface devices (e.g., headphones, keyboards, and mouses). Cellular network technologies 520 often provide non-contention based access (e.g., dedicated user access) and can be used over varying geographic ranges. Cellular voice or video delivery is a good example of streaming data applications. Artisans of ordinary skill in the related arts will readily recognize that the foregoing examples are purely illustrative, and that different communication technologies are often used to support a variety of different types of application data. For example, Wi-Fi 516 can support file transfer, real time data transmission and/or interactive data with equivalent success.

Referring back to FIG. 5, the presence of multiple concurrently executing applications of FIG. 5 (real time application 502, interactive application 504, and file transfer applications 506) illustrates the complexities of multi-threaded operation. As shown therein, the exemplary multi-threaded operation incurs a number of server loops. Each server loop represents a logical break in the process during which the processor can context switch (see also aforementioned discussion of Existing Performance Optimization Technologies, and corresponding FIG. 2).

Moreover, in the computing arts, a "locking" synchronization mechanism is used by the kernel to enforce access limits (e.g., mutual exclusion) on resources in multi-threaded execution. During operation, each thread acquires a lock before accessing the corresponding locked resources data. In other words, at any point in time, the processor is necessarily limited to only the resources available to its currently executing process thread.

Unfortunately, each of the applications has different latency, throughput and processing utilization requirements. Since, each of the network interfaces is sending and receiving data at different times, in different amounts, and with different levels of priority. From a purely logistical standpoint, the kernel is constantly juggling between high priority kernel threads (to ensure that the high priority hardware activities do not stall out) while still servicing each of its concurrently running applications to attempt to provide acceptable levels of service. In some cases, however, the kernel is bottlenecked by the processor's capabilities. Under such situations, some threads will be deprioritized; currently, the traditional networking stack architecture is unable it clearly identify which threads can be deprioritized while still providing acceptable user service.

For example, consider an "expected use" device of FIG. 5; the processor is designed for the expected use case of providing streaming video. Designing for expected use cases allows the device manufacturer to use less capable, but adequate components thereby reducing bill of materials (BOM) costs and/or offering features at a reasonable price point for consumers. In this case, a processor is selected that nominally meets the requirements for a streaming video application that is receiving streaming video data via one of the network interfaces (e.g., the Wi-Fi interface), and constantly servicing the kernel threads associated with it. Rendering the video with a real time application 502 from the received data is a user space application that is executed concurrently but at a significantly lower priority. During expected usage, the video rendering is adequate.

Unfortunately, the addition of an unexpected amount of additional secondary interactive applications 504 (e.g., remote control interface, headphones, and/or other interface devices) and/or background file transfer applications can easily overwhelm the processor. Specifically, the primary real time application does not get enough CPU cycles to run within its time budget, because the kernel threads handling networking are selected at a higher priority. In other words, the user space application is not able to depress the priority of kernel networking threads (which are servicing both the primary and secondary processes). This can result in significantly worse user experience when the video rendering stalls out (video frame misses or video frame drops); whereas simply slowing down a file transfer or degrading the interaction interface may have been preferable.

Prior art solutions have tailored software for specific device implementations (e.g., the Apple TV®). For example, the device can be specifically programmed for an expected use. However, tailored solutions are becoming increasingly common and by extension the exceptions have swallowed the more generic use case. Moreover, tailored solutions are undesirable from multiple software maintenance standpoints. Devices have limited productive lifetimes, and software upkeep is non-trivial.

Ideally, a per-application or per-profile workload optimization would enable a single processor (or multiple processors) to intelligently determine when and/or how too intelligently context switch and/or prioritize its application load (e.g., in the example of FIG. 5, to prioritize video decode). Unfortunately, such solutions are not feasible within the context of the existing generic network sockets and generic network interfaces to a monolithic communications stack.

Exemplary Networking Architecture

A networking stack architecture and technology that caters to the needs of non-kernel based networking use cases is disclosed herein. Unlike prior art monolithic networking stacks, the exemplary networking stack architecture described hereinafter includes various components that span multiple domains (both in-kernel, and non-kernel), with varying transport compositions, workload characteristics and parameters.

In one exemplary embodiment, a networking stack architecture is disclosed that provides an efficient infrastructure to transfer data across domains (user space, non-kernel, and kernel). Unlike the traditional networking paradigm that hide the underlying networking tasks within the kernel and substantially limits control thereof by any non-kernel applications, the various embodiments described herein enable faster and more efficient cross domain data transfers.

Various embodiments of the present disclosure provide a faster and more efficient packet input/output (I/O) infrastructure than prior art techniques. Specifically, unlike traditional networking stacks that use a "socket" based communication, disclosed embodiments can transfer data directly between the kernel and user space domains. Direct transfer reduces the per-byte and per-packet costs relative to socket based communication. Additionally, direct transfer can improve observability and accountability with traffic monitoring.

In one such variant, a simplified data movement model that does not require mbufs (memory buffers) is described in greater detail herein. During one such exemplary operation, the non-kernel processes can efficiently transfer packets directly to and from the in-kernel drivers.

In another embodiment, a networking stack architecture is disclosed that exposes the networking protocol stack infrastructure to user space applications via network extensions. In one such embodiment, the network extensions are software agents that enable extensible, cross-platform-capable, user space control of the networking protocol stack functionality. In another such embodiment, an in-process user space networking stack facilitates tighter integration between the protocol layers (including TLS) and the application or daemon. In some cases, the user space architecture can expose low-level networking interfaces to transport protocols and/or encapsulation protocols such as UDP, TCP, and QUIC; and enable network protocol extensions and rapid development cycles. Moreover, artisans of ordinary skill in the related arts, given the contents of the present disclosure, will readily appreciate that the various principles described herein may be applied to a variety of other operating systems (such as Windows, Linux, Unix, Android), and/or other cross platform implementations.

In some variants, exemplary embodiments of the networking stack can support multiple system-wide networking protocol stack instances (including an in-kernel traditional network stack). Specifically, in one such variant, the exemplary networking stack architecture coexists with the traditional in-kernel networking stack so as to preserve backwards compatibility for legacy networking applications. In such implementations, the in-kernel network stack instance can coexist with the non-kernel network stack via namespace sharing and flow forwarding.

As used herein, an "instance" may refer to a single copy of a software program or other software object; "instancing" and "instantiations" refers to the creation of the instance. Multiple instances of a program can be created; e.g., copied into memory several times. Software object instances are instantiations of a class; for example, a first software agent and second software instance are each distinct instances of the software agent class.

In one such implementation, load balancing for multiple networking stacks is handled within the kernel, thereby ensuring that no single networking stack (including the in-kernel stack) monopolizes system resources.

As a related variant, current/legacy applications can be handled within the in-kernel stack. More directly, by supporting a separate independent in-kernel BSD stack, legacy applications can continue to work without regressions in functionality and performance.

Figure 6:
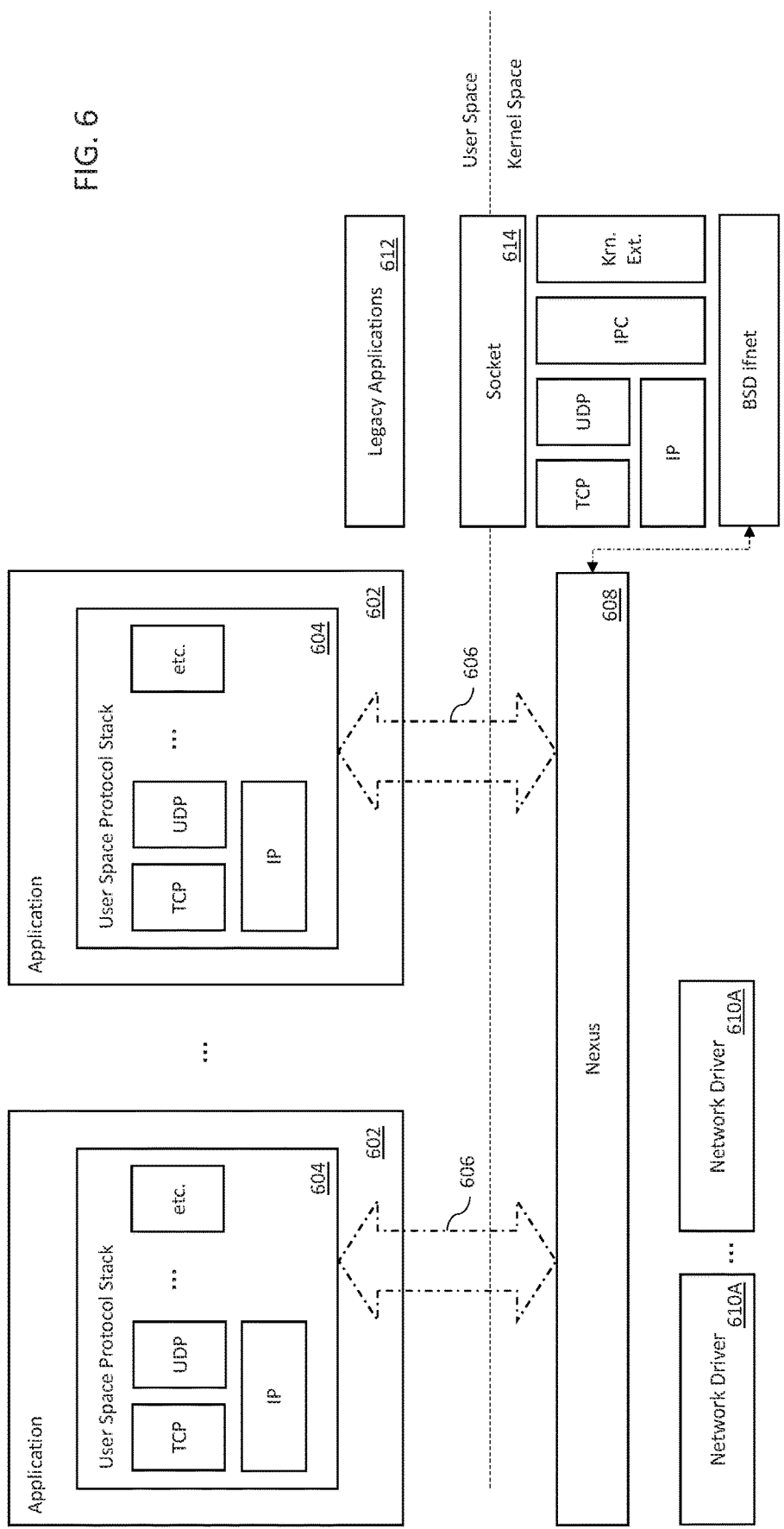
FIG. 6 is a logical representation of an exemplary networking stack architecture, in accordance with the various aspects of the present disclosure.

FIG. 6 illustrates one logical representation of an exemplary networking stack architecture, in accordance with the various aspects of the present disclosure. While the system depicts a plurality of user space applications 602 and/or legacy applications 612, artisans of ordinary skill will readily appreciate given the contents of the present disclosure that the disclosed embodiments may be used within single application systems with equivalent success.

As shown, a user space application 602 can initiate a network connection by instancing user space protocol stacks 604. Each user space protocol stacks includes network extensions for e.g., TCP/UDP/QUIC/IP, cryptography, framing, multiplexing, tunneling, and/or any number of other networking stack functionalities. Each user space protocol stack 604 communicates with one or more nexuses 608 via a channel input/output (I/O) 606. Each *nexus* 608 manages access to the network drivers 610. Additionally shown is legacy application 612 support via existing network socket technologies 614. While the illustrated embodiment shows *nexus* connections to both user space and in-kernel networking stacks, it is appreciated that the *nexus* may also enable e.g., non-kernel networking stacks (such as may be used by a daemon or other non-kernel, non-user process).

The following topical sections hereinafter describe the salient features of the various logical constructs in greater detail.

Exemplary I/O Infrastructure

In one exemplary embodiment, the non-kernel networking stack provides a direct channel input output (I/O) 606. In one such implementation, the channel I/O 606 is included as part of the user space protocol stack 604. More directly, the channel I/O 606 enables the delivery of packets as a raw data I/O into kernel space with a single validation (e.g., only when the user stack provides the data to the one or more nexuses 608). The data can be directly accessed and/or manipulated in situ, the data need not be copied to an intermediary buffer.

In one exemplary implementation, a channel is an I/O scheme leveraging kernel-managed shared memory. During an access, the channel I/O is presented to the process (e.g., the user process or kernel process) as a file descriptor based object, rather than as data. In order to access the data, the process de-references the file descriptor for direct access to the shared memory within kernel space. In one such implementation, the file descriptor based object based I/O is compatible with existing operating system signaling and "eventing" (event notification/response) mechanisms. In one exemplary variant, the channel I/O is based on Inter Process Communication (IPC) packets.

As used herein, the term "descriptor" may refer to data structures that indicate how other data is stored. Descriptors generally include multiple parameters and can be used to identify more complex data structures; for example, a descriptor may include one or more of type, size, address, tag, flag, headers, footers, metadata, structural links to other data descriptors or locations, and/or any other number of format or construction information.

Within the context of the present disclosure, as used herein, the term "pointer" may refer to a specific reference data type that "points" or "references" a location of data in memory. Typically, a pointer stores a memory address that is interpreted by a compiler as an absolute location in system memory or a relative location in system memory based on e.g., a base address, reference address, memory window, or other memory subset. During operation, a pointer is "dereferenced" to recover the data that is stored in the location of memory.

As used herein, the term "metadata" refers to data that describes data. Metadata varies widely in application, but generally falls into one of the descriptive, structural, and/or administrative categories. Descriptive metadata describes data in a manner to enable e.g., discovery and/or identification. Common examples include without limitation e.g., type, size, index tags, and keywords. Structural metadata describes the structure of the data e.g., how compound objects are put together. Common examples include without limitation e.g., prefix, postfix, table of contents, order, and/or any other information that describes the relationships and other characteristics of digital materials. Administrative metadata provides information to help manage a resource; common examples include e.g., authorship and creation information, access privileges, and/or error checking and security based information (e.g., cyclic redundancy checks (CRC), parity, etc.).

In one exemplary embodiment, the channel I/O can be further leveraged to provide direct monitoring of its corresponding associated memory. More directly, unlike existing data transfers which are based on mbuf based divide/copy/move, etc., the channel I/O can provide (with appropriate viewing privileges) a direct window into the memory accesses of the system. Such implementations further simplify software development as debugging and/or traffic monitoring can be performed directly on traffic. Direct traffic monitoring can reduce errors attributed to false positives/false negatives caused by e.g., different software versioning, task scheduling, compiler settings, and/or other software introduced inaccuracies.

More generally, unlike prior art solutions which relied on specialized networking stack compositions to provide different degrees of visibility at different layers, the monitoring schemes of the present disclosure provide consistent system-wide channel monitoring infrastructures. Consistent frameworks for visibility, accounting, and debugging greatly improve software maintenance and upkeep costs.

Additionally, simplified schemes for egress filtering can be used to prevent traffic spoofing for user space networking stack instances. For example, various embodiments ensure that traffic of an application cannot be hijacked by another malicious application (by the latter claiming to use the same tuple information, e.g. TCP/UDP port).

In one exemplary embodiment, the in-kernel network device drivers (e.g. Wi-Fi, Cellular, Ethernet) use simplified data movement models based on the aforementioned channel I/O scheme. More directly, the user space networking stacks can directly interface to each of the various different technology based network drivers via channel I/O; in this manner, the user space networking stacks do not incur the traditional data mbuf based divide/copy/move penalties. Additionally, user space applications can directly access user space networking components for immediate traffic handling and processing.

Exemplary *Nexus*

In one exemplary embodiment, the networking stack connects to one or more *nexus* 608. In one such implementation, the *nexus* 608 is a kernel space process that arbitrates access to system resources including, without limitation e.g., shared memory within kernel space, network drivers, and/or other kernel or user processes. In one such variant, the *nexus* 608 aggregates one or more channels 606 together for access to the network drivers 610 and/or shared kernel space memory.

In one exemplary implementation, a *nexus* is a kernel process that determines the format and/or parameters of the data flowing through its connected channels. In some variants, the *nexus* may further perform ingress and/or egress filtering.

The *nexus* may use the determined format and/or parameter information to facilitate one-to-one and one-to-many topologies. For example, the *nexus* can create user-pipes for process-to-process channels; kernel-pipes for process-to-kernel channels; network interfaces for direct channel connection from a process to in-kernel network drivers, or legacy networking stack interfaces; and/or flow-switches for multiplexing flows across channels (e.g., switching a flow from one channel to one or more other channels).

Additionally, in some variants the *nexus* may provide the format, parameter, and/or ingress egress information to kernel processes and/or one or more appropriately privileged user space processes.

In one exemplary embodiment, the *nexus* 608 may additionally ensure that there is fairness and/or appropriately prioritize each of its connected stacks. For example, within the context of FIG. 6, the *nexus* 608 balances the network priorities of both the existing user space protocol stacks 604, as well as providing fair access for legacy socket based access 614. For example, as previously alluded to, existing networking stacks could starve user space applications because the kernel threads handling the legacy networking stack operated at higher priorities than user space applications. However, the exemplary *nexus* 608 ensures that legacy applications do not monopolize system resources by appropriately servicing the user space network stacks as well as the legacy network stack.

In one such embodiment, in-kernel, non-kernel, and/or user space infrastructures ensure fairness and can reduce latency due to e.g., buffer bloat (across channels in a given *nexus*, as well as flows within a channel). In other words, the in-kernel and/or user space infrastructures can negotiate proper buffering sizes based on the expected amount of traffic and/or network capabilities for each flow. By buffering data according to traffic and/or network capability, buffers are not undersized or oversized.

As a brief aside, "buffer bloat" is commonly used to describe e.g., high latency caused by excessive buffering of packets. Specifically, buffer bloat may occur when excessively large buffers are used to support a real time streaming application. As a brief aside, TCP retransmission mechanism relies on measuring the occurrence of packet drops to determine the available bandwidth. Under certain congestion conditions, excessively large buffers can prevent the TCP feedback mechanism from correctly inferring the presence of a network congestion event in a timely manner (the buffered packets "hide" the congestion, since they are not dropped). Consequently, the buffers have to drain before TCP congestion control resets and the TCP connection can correct itself.

Referring back to FIG. 6, in one exemplary embodiment, Active Queue Management (AQM) can be implemented in the kernel across one or more (potentially all) of the flow-switch clients (user space and in-kernel networking stack instances). AQM refers to the intelligent culling of network packets associated with a network interface, to reduce network congestion. By dropping packets before the queue is full, the AQM ensures no single buffer approaches its maximum size, and TCP feedback mechanisms remain timely (thereby avoiding the aforementioned buffer bloat issues).

While the foregoing example is based on "fairness" standard, artisans of ordinary skill in the related arts will readily appreciate that other schemes may be substituted with equivalent success given the contents of the present disclosure. For example, some embodiments may dynamically or statically service the user application networking space with greater or less weight compared to the legacy socket based access. For example, user application networking space may be more heavily weighted to improve overall performance or functionality, whereas legacy socket based access may be preferred where legacy applications are preferentially supported (e.g., see Protocol Unloading and Offloading, discussed infra).

Exemplary Network Extensions

In one exemplary embodiment of the present disclosure, a network extension is disclosed. A network extension is an agent-based extension that is tightly coupled to network control policies. The agent is executed by the kernel and exposes libraries of network control functionality to user space applications. During operation, user space software can access kernel space functionality through the context and privileges of the agent.

As used herein, the term "agent" may refer to a software agent that acts for a user space application or other program in a relationship of agency with appropriate privileges. The agency relationship between the agent and the user space application implies the authority to decide which, if any, action is appropriate given the user application and kernel privileges. A software agent is privileged to negotiate with the kernel and other software agents regarding without limitation e.g., scheduling, priority, collaboration, visibility, and/other sharing of user space and kernel space information. While the agent negotiates with the kernel on behalf of the application, the kernel ultimately decides on scheduling, priority, etc.

Various benefits and efficiencies can be gained through the use of network extensions. In particular, user space applications can control the protocol stack down to the resolution of exposed threads (i.e., the threads that are made available by the agent). In other words, software agents expose specific access to lower layer network functionality which was previously hidden or abstracted away from user space applications. For example, consider the previous examples of TLS record sizing (see e.g., FIG. 3, and related discussion); by exposing TCP network conditions to the TLS application within the user space, the TLS application can correctly size records for network congestion and/or wait for underlying TCP retransmissions (rather than timing out).

Similarly, consider the previous examples of multi-threading within the context of expected use devices (see e.g., FIG. 5, and related discussion); the primary user space application (e.g., video coding) and additional secondary interactive applications (e.g., remote control interface, headphones, and/or other interface devices) can internally negotiate their relative priority to the user's experience. The user space applications can appropriately adjust their priorities for the *nexus* (i.e., which networking threads are serviced first and/or should be deprioritized). Consequently, the user space applications can deprioritize non-essential network accesses, thereby preserving enough CPU cycles for video decode.

As a related benefit, since a software agent represents the application to the kernel; the agent can trust the kernel, but the kernel may or may not trust the agent. For example, a software agent can be used by the kernel to convey network congestion information in a trusted manner to the application; similarly, a software agent can be used by an application to request a higher network priority. Notably, since a software agent operates from user space, the agent's privilege is not promoted to kernel level permissions. In other words, the agent does not permit the user application to exceed its privileges (e.g., the agent cannot commandeer the network driver at the highest network priority, or force a read/write to another application's memory space without the other kernel and/or other application's consent).

Networking extensions allow the user space application to execute networking communications functionality within the user space and interpose a network extension between the user space application and the kernel space. As a result, the number of cross domain accesses for complex layering of different protocol stacks can be greatly reduced. Limiting cross domain accesses prevents context switching and allows the user space to efficiently police its own priorities. For example, consider the previous example of a VPN session as was previously illustrated in FIG. 4. By keeping the TCP/IP, Internet Protocol Security (IPsec) and TLS operations within user space, the entire tunnel can be performed within the user space, and only cross the user/kernel domain once.

As used herein, the term "interposition" may refer to the insertion of an entity between two or more layers. For example, an agent is interposed between the application and the user space networking stack. Depending on the type of agent or network extension, the interposition can be explicit or implicit. Explicit interposition occurs where the application explicitly instances the agent or network extension. For example, the application may explicitly call a user space tunnel extension. In contrast, implicit interposition occurs where the application did not explicitly instance the agent or network extension. Common examples of implicit interposition occur where one user space application sniffs the traffic or filters the content of another user space application.

Namespace Sharing & Flow Forwarding Optimizations

In one exemplary optimization of the present disclosure, the *nexus* includes a namespace registration and management component that manages a common namespace for all of its connected networking stack instances. As a brief aside, a namespace generally refers to a set of unique identifiers (e.g., the names of types, functions, variables) within a common context. Namespaces are used to prevent naming "collisions" which occur where multiple processes call the same resource differently and/or call different resources the same.

In one such implementation, the shared networking protocol has a common namespace (e.g., {Address, Protocol, and Port}) across multiple networking stack instances. Sharing a namespace between different networking stacks reduces the amount of kernel burden, as the kernel can natively translate (rather than additionally adding a layer of network address translation).

For example, if a first application acquires port 80, the namespace registration ensures that other applications will not use port 80 (e.g., they can be assigned e.g., port 81, 82, etc.) In some such implementations, legacy clients may use default namespaces that conflict (e.g., a default web client may always select port 80); thus the shared namespace registration may also be required to force a re-assignment of a new identifier (or else translate for) such legacy applications.

In one exemplary embodiment, the namespace registration and management components control flow-switching and forwarding logic of each flow-switch *nexus* instance. For example, as previously noted, the *nexus* can create user-pipes for process-to-process channels; kernel-pipes for process-to-kernel channels; network interfaces for direct channel connection from a process to in-kernel network drivers, or legacy networking stack interfaces; and/or flow-switches for multiplexing flows across channels (e.g., switching a flow from one channel to one or more other channels).

For example, during normal operation when an application requests a port, the namespace registration and management will create a flow and assign a particular port to the application. Subsequent packets addressed to the port will be routed appropriately to the flow's corresponding application. In one such variant, packets that do not match any registered port within the shared namespace registration and management will default to the legacy networking stack (e.g., the flow-switch assumes that the unrecognized packet can be parsed and/or ignored by the fallback legacy stack).

Artisans of ordinary skill in the related arts will readily appreciate, given the contents of the present disclosure that disparate and/or otherwise distinct namespace registrations and/or management components may be preferable based on other implementation specific considerations. For example, some implementations may prefer to shield namespaces from other external processes e.g., for security and/or privacy considerations. In other implementations, the benefits associated with native namespace translation may be less important than supporting legacy namespaces.

Protocol Onloading and Offloading

In the foregoing discussions, the improvements to user space operation may be primarily due to the user space networking stack, as shown in FIG. 6. However, various embodiments of the present disclosure also leverage the existing legacy host networking infrastructure to handle networking transactions which are unrelated to user experience.

Colloquially, the term "hardware offload" may be commonly used to denote tasks which can be handled within dedicated hardware logic to improve overall processing speed or efficiency. One such example is the cyclic redundancy check (CRC) calculation which is an easily parameterized, closed, iterative calculation. The characteristics of CRC calculation lend itself to hardware offload because the CRC does not benefit from the flexibility of a general purpose processor, and CRC calculations are specialized functions that are not transferable to other processing operations.

By analogous extension, as used herein, the term "protocol offload" may refer to processes that should be handled within the legacy networking stack because they are not specific to a user space application or task. In contrast, the term "protocol onload" may refer to processes that should be handled within a user space networking stack because they are specific to a user space application or task and benefit the overall performance. As a general qualitative criteria, tasks which are "fast" (e.g., generally UDP/TCP/IP based user space applications) are protocol onloaded to improve user performance; in contrast "slow" tasks (e.g., ARP, IPv6 Neighbor Discovery, Routing table updates, control path for managing interfaces, etc.) are protocol offloaded.

For example, consider Address Resolution Protocol (ARP) request handling; when an ARP request comes in, the host processor responds with a reply. However, the ARP request is non-specific to a user space application; rather the ARP reply concerns the holistic system. More generally, any networking process that is not specific to an application space can be implemented within the kernel under legacy techniques. Alternatively, any process that can be handled regardless of device state should remain with the kernel (e.g., the kernel persists across low power states, and is never killed).

By allowing the mature in-kernel networking stack to retain ownership of certain control logic (e.g. routing and policy table, interface configuration, address management), various embodiments of the present disclosure avoid "split-brain" behaviors. In other words, the kernel ensures that networking data and/or availability remains consistent regardless of the user space application availability.

Exemplary User Space Networking Stack

Figure 7:
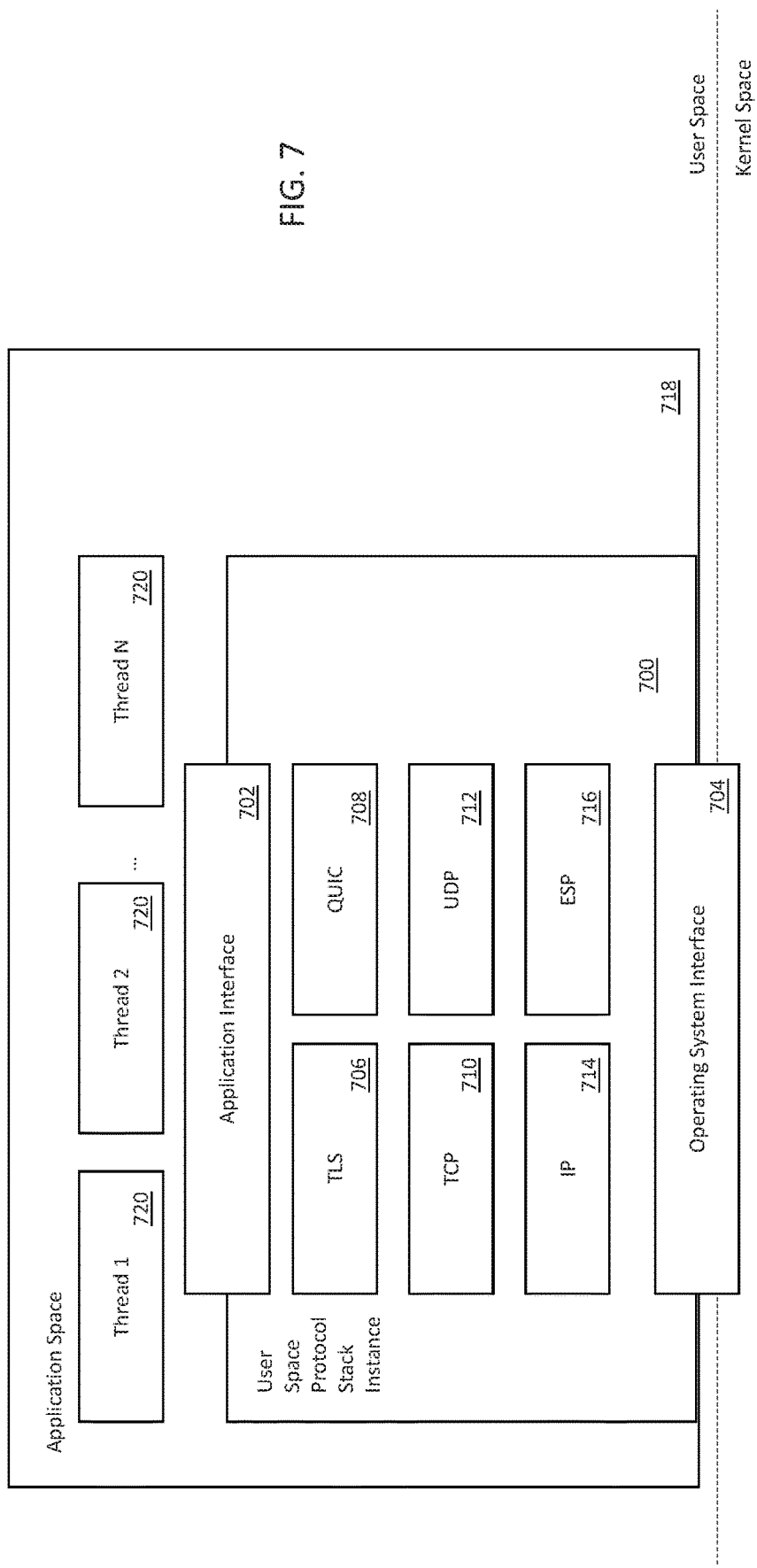
FIG. 7 is a logical block diagram of an exemplary user space networking stack, in accordance with the various aspects of the present disclosure.

Referring now to FIG. 7, one logical block diagram of an exemplary user space networking stack 700 is depicted. As shown, the user space networking stack 700 includes an application interface 702, and an operating system interface 704. Additionally, the user space networking stack includes one or more user space instances of TLS 706, QUIC 708, TCP 710, UDP 712, IP 714, and ESP 716. The disclosed instances are purely illustrative, artisans of ordinary skill in the related arts will readily appreciate that any other user space kernel extension and/or socket functionality may be made available within the user space networking stack 700.

In one exemplary embodiment, the user space networking stack 700 is instantiated within an application user space 718. More directly, the user space networking stack 700 is treated identically to any one of multiple threads 710 within the application user space 718. Each of the coexisting threads 720 has access to the various functions and libraries offered by the user space networking stack via a direct function call.

As a brief aside, each of the threads 720 reside within the same address space. By virtue of their shared addressability, each of the threads may grant or deny access to their portions of shared address space via existing user space memory management schemes and/or virtual machine type protections. Additionally, threads can freely transfer data structures from one to the other, without e.g., incurring cross domain penalties. For example, TCP data 710 can be freely passed to TLS 706 as a data structure within a user space function call.

As previously noted, the user space networking stack 700 may grant or deny access to other coexistent user space threads; e.g., a user space thread is restricted to the specific function calls and privileges made available via the application interface 702. Furthermore, the user space networking stack 700 is further restricted to interfacing the operating system via the specific kernel function calls and privileges made available via the operating system interface 704. In this manner, both the threads and the user space networking stack have access and visibility into the kernel space, without compromising the kernel's security and stability.

One significant benefit of the user space networking stack 700 is that networking function calls can be made without acquiring various locks that are present in the in-kernel networking stack. As previously noted, the "locking" mechanism is used by the kernel to enforce access limits on multiple threads from multiple different user space applications; however in the user space, access to shared resources are handled within the context of only one user application space at a time, consequently access to shared resources are inherently handled by the single threading nature of user space execution. More directly, only one thread can access the user space networking stack 700 at a time; consequently, kernel locking is entirely obviated by the user space networking stack.

Another benefit of user space based network stack operation is cross platform compatibility. For example, certain types of applications (e.g., iTunes®, Apple Music® developed by the Assignee hereof) are deployed over a variety of different operating systems. Similarly, some emerging transport protocols (e.g. QUIC) are ideally served by portable and common software between the client and server endpoints. Consistency in the user space software implementation allows for better and more consistent user experience, improves statistical data gathering and analysis, and provides a foundation for enhancing, experimenting and developing network technologies used across such services. In other words, a consistent user space networking stack can be deployed over any operating system platform without regard for the native operating system stack (e.g., which may vary widely).

Another important advantage of the exemplary user space networking stack is the flexibility to extend and improve the core protocol functionalities, and thus deliver specialized stacks based on the application's requirements. For example, a video conferencing application (e.g., FaceTime® developed by the Assignee hereof) may benefit from a networking stack catered to optimize performance for real-time voice and video-streaming traffics (e.g., by allocating more CPU cycles for video rendering, or conversely deprioritizing unimportant ancillary tasks). In one such variant, a specialized stack can be deployed entirely within the user space application, without specialized kernel extensions or changes to the kernel. In this manner, the specialized user space networking stack can be isolated from networking stacks. This is important both from a reliability standpoint (e.g., updated software doesn't affect other software), as well as to minimize debugging and reduce development and test cycle times.

Furthermore, having the network transport layer (e.g. TCP, QUIC) reside in user space can open up many possibilities for improving performance. For example, as previously alluded to, applications (such as TLS) can be modified depending on the underlying network connections. User space applications can be collapsed or tightly integrated into network transports. In some variants, data structure sizes can be adjusted based on immediate lower layer network condition information (e.g., to accommodate or compensate for poor network conditions). Similarly, overly conservative or under conservative transport mechanisms can be avoided (e.g., too much or not enough buffering previously present at the socket layer). Furthermore, unnecessary data copies and/or transforms can be eliminated and protocol signaling (congestion, error, etc.) can be delivered more efficiently.

In yet another embodiment, the exemplary user space networking stack further provides a framework for both networking clients and networking providers. In one such variant, the networking client framework allows the client to interoperate with any network provider (including the legacy BSD stack). In one such variant, the network provider framework provides consistent methods of discovery, connection, and data transfer to networking clients. By providing consistent frameworks for clients and providers which operate seamlessly over a range of different technologies (such as a VPN, Bluetooth, Wi-Fi, cellular, etc.), the client software can be greatly simplified while retaining compatibility with many different technologies.

Exemplary Proxy Agent Application Operation

Figure 8:
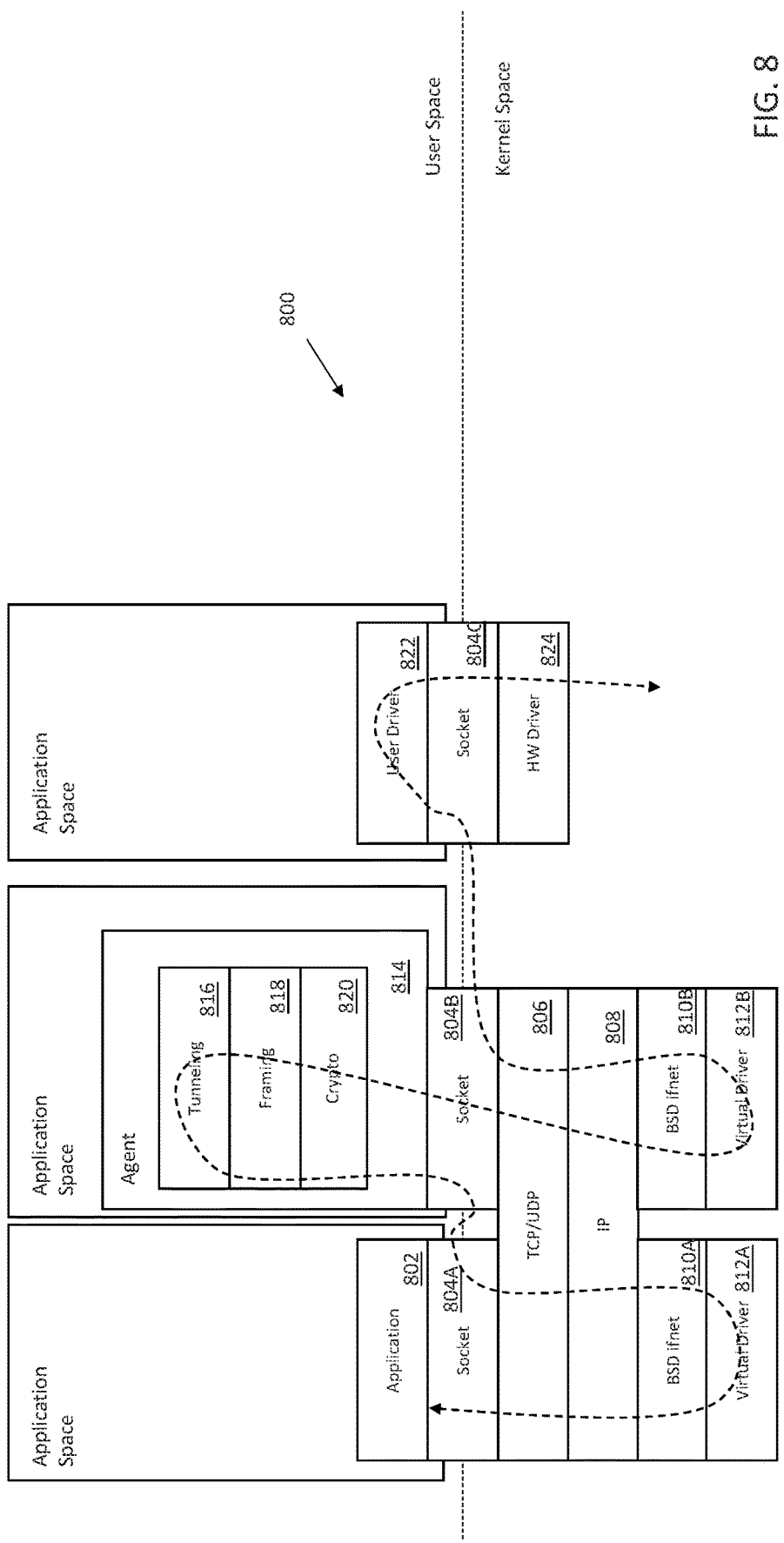
FIG. 8 is a logical flow diagram useful to summarize the convoluted data path taken for a prior art application using a proxy agent application within the context of the traditional networking stack, useful for explaining various aspects of the present disclosure.

FIG. 8 depicts one logical flow diagram useful to summarize the convoluted data path taken for a prior art application using a proxy agent application within the context of the traditional networking stack. As shown therein, an application 802 transmits data via a socket 804A to route data packets to a proxy agent application 814 via a TCP/IP 806/808 and a BSD network interface 810A. The data packets enter kernel space; this is a first domain crossing which incurs validation and context switching penalties.

Inside the kernel, the data is divided/copied/moved for delivery via the TCP/IP stack 806/808 to the BSD network interface 810A. The BSD network interface 810A routes the data to a virtual driver 812A. These steps may introduce buffering delays as well as improper buffer sizing issues such as buffer bloat.

In order to access the application proxy (which is in a different user space), the virtual driver reroutes the data to a second socket 804B which is in the different user space from the original application. This constitutes a second domain crossing, which incurs additional validation and context switching penalties.

In user space, the data enters an agent 814 which prepares the data for delivery (tunneling 816, framing 818, and cryptographic security 820). Thereafter, the proxy agent 814 transmits the prepared data via a socket 804B to route data packets to a user space driver 822 via the TCP/IP 806/808 and a separate BSD network interface 810B. Again, the data is passed through the socket 804B. This is a third domain crossing, with validation and context switching penalties.

Inside the kernel, the data is divided/copied/moved for delivery via the TCP/IP stack 806/808 to a BSD network interface 810B. The steps of The BSD network interface 810B routes the data to a virtual driver 812B. These steps introduce additional buffering delays as well as improper buffer sizing issues such as buffer bloat.

Finally, the virtual driver 812B reroutes the data to the user space driver (e.g., a Universal Serial Bus (USB) driver), which requires another socket transfer from 804B to 804C; the data crosses into the user space for the user based driver 822, and crosses the domain a fifth time to be routed out the USB Hardware (H/W) driver 824. Each of these domain crossings are subject to the validation and context switching penalties as well as any buffering issues.

FIG. 9 depicts one logical flow diagram useful to summarize an exemplary proxy agent application within the context of the user space networking stack, in accordance with the various aspects of the present disclosure.

As shown therein, an application 902 provides data via shared memory space file descriptor objects to the agent 904. The agent 904 internally processes the data via TCP/IP 906/908 to the tunneling function 910. Thereafter, the data is framed 912, cryptographically secured 914, and routed via TCP/IP 906/908 to the user driver 916. The user driver uses a channel I/O to communicate with *nexus* 918 for the one (and only) domain crossing into kernel space. Thereafter, the *nexus* 918 provides the data to the H/W driver 920.

When compared side-by-side, the user space networking stack 900 has only one (1) domain crossing, compared to the traditional networking stack 800 which crossed domains five (5) times for the identical VPN operation. Moreover, each of the user space applications could directly pass data via function calls within user memory space between each of the intermediary applications, rather than relying on the kernel based generic mbuf divide/copy/move scheme (and its associated buffering inefficiencies).

User Packet Pool

Traditional in-kernel networking stacks are unaware of user space application requirements, and thus always allocate as much memory as possible (to accommodate the worst case scenario). However, as previously noted, user space networking stacks can be far more aggressive, and dynamically allocate memory (and/or free memory) on an as needed basis.

Unfortunately, dynamically allocated memory can introduce other potential issues. For example, whenever the user application asks for a new memory allocation via a system call, the kernel returns the memory allocation. This cross domain transition can result in the aforementioned performance issues (due to context switching, etc.). More directly, dynamically allocated memory schemes introduce cross domain system calls that must be moderated to enable each process to achieve the maximum possible throughput.

An efficient scheme should dynamically scale up and down the memory available to each process according to the current throughput requirements. In one such exemplary embodiment, the user packet pool uses an efficient packet I/O mechanism to move memory buffers across kernel-user boundary and utilizes channel sync statistics to dynamically scale the amount of memory available to each channel. To these ends, improved solutions are needed to reuse packet pools between different non-kernel communication stacks in order to allow for the allocation (or deallocation) of physical memory for a given non-kernel communication stack. Notably, as non-kernel communication stacks are not trusted, one cannot simply "move" memory allocations between different non-kernel communication stacks, as this could potentially introduce security concerns between these different non-kernel communication stacks.

Figure 10A:
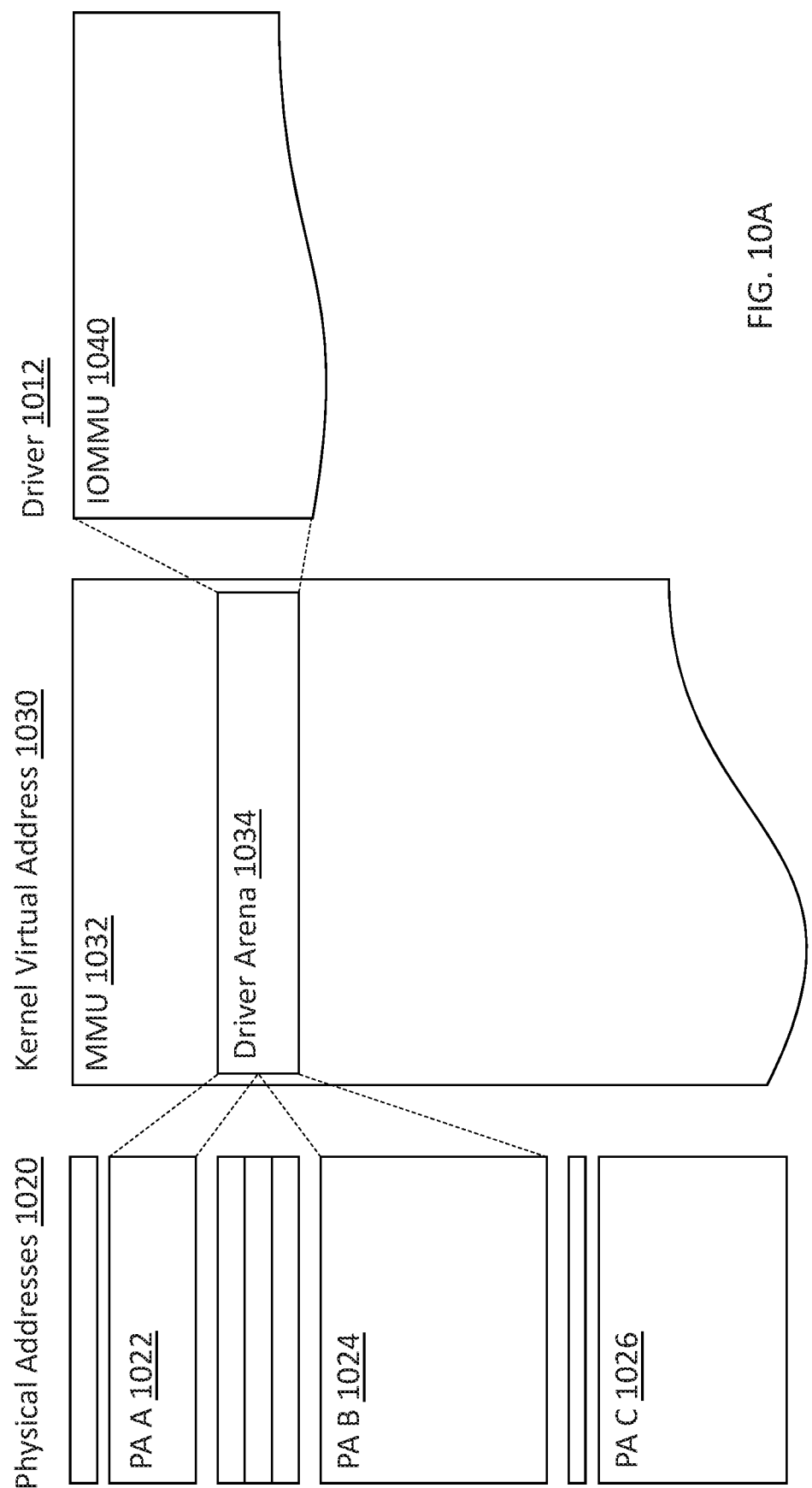
Figure 10C:
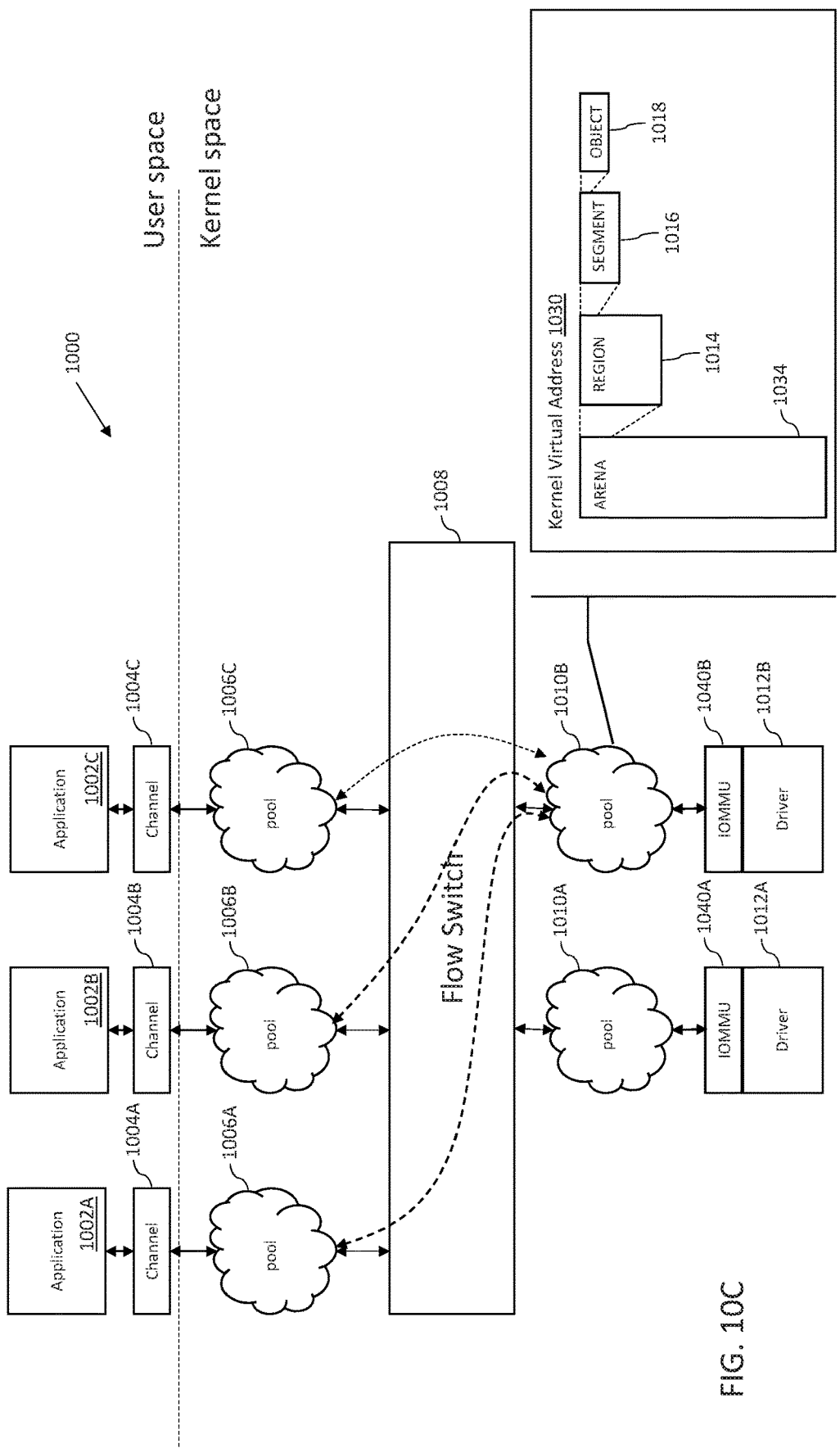

FIGS. 10A-C are logical block diagrams of an exemplary implementation of a packet pool for a non-kernel space application. One common example of non-kernel space application is a driver. Referring to FIG. 10A, a driver 1012 may be allocated an input-output memory management unit (IOMMU) 1040. In some variants, the IOMMU 1040 or a portion thereof may be required to be wired (i.e., backed with physical pages). As a brief aside, many drivers may read/write to memory independently of the operating system (i.e., the O/S cannot swap back the memory). Traditionally speaking, an IOMMU is a type of memory management unit (MMU) that connects a DMA-capable I/O bus to physical addresses within memory. However, in the context of the present disclosure, the IOMMU 1040 for, for example, a driver 1012 is only capable of accessing a virtual address space (e.g., a driver arena 1034) within the system MMU 1032, based on a kernel virtual address (KVA) 1030. While a single driver arena 1034 is illustrated in FIG. 10A, it would be readily apparent to one of ordinary skill given the contents of the present disclosure that two or more driver arenas may be allocated to the driver 1012 (via the IOMMU 1040). In some implementations, from the perspective of the driver 1012, the driver is allocated a contiguous block of memory within the MMU 1032.

The KVA 1030 provides the necessary translation between a virtual address space within the driver arena 1034 and physical addresses 1020 in memory. For example, as illustrated in FIG. 10A, the driver arena 1034 within the KVA 1030, points to two contiguous physical address spaces in memory (i.e., physical address space A 1022 and physical address space B 1024). Physical address space A 1022 may constitute "wired" memory, while physical address B 1024 may constitute purgeable memory. Accordingly, if driver 1012 doesn't require the full amount of memory allocated in its driver arena 1034, the KVA 1030 may deallocate physical address B 1024. If the driver 1012 subsequently requires additional memory, the KVA 1030 may reallocate physical address B 1024, or may even allocate to another physical address space (e.g., physical address C 1026). These and other variants would be readily apparent to one of ordinary skill given the contents of the present disclosure.

Referring now to FIG. 10B, a managed pool 1010 of resources may include driver arena 1034. The driver arena 1034 may be composed of an arbitrary (or predetermined) number of region(s) 1014. Each region 1014 may further be composed of an arbitrary (or predetermined) number of "slabs" or "segments" 1016. Each slab or segment 1016 may further be dynamically (or statically) mapped to a corresponding I/O address via an IOMMU (1040, FIG. 10A). The KVA (1030, FIG. 10A) may dynamically (and/or statically) direct the driver arena 1034 towards physical addresses in memory (1020, FIG. 10A). Each slab or segment 1016 may be dynamically (or statically) sized to accommodate a set amount of data. For example, in some implementations, each slab or segment 1016 may be dynamically sized into multiples of page size (e.g., 4 KB, 16 KB, 32 KB, etc.). Each slab or segment 1016 may further be subdivided into objects 1018 which may be established in accordance with its own dynamic (or static) sizing. For example, each object 1018 may include 2 KB of data, for example, packet metadata, buffers and/or other memory structures. Herein lies one salient advantage of the architecture of the present disclosure, namely the ability to tailor the size of these regions, slabs and/or objects so as to most efficiently optimize the data transfers between, for example, a driver and a given application. Moreover, the application (or driver) based sizing of regions, slabs and/or objects may differ between respective applications in order to more efficiently handle these data transfers. For example, given the prior disclosed application in which the application may be required to transfer 2.5 KB of data, the size of these memory source allocations may occur in, for example, multiples of 2.5 KB.

Referring now to FIG. 10C, one exemplary implementation for a system for managed pool resources 1000 for use in accordance with embodiments of the present disclosure is now shown and described in detail. The system 1000 may take on any number of electronic device forms including, without limitation, a desktop computer, a laptop computer, a tablet, a smart phone, an audio/visual computer, smart wearable devices, and other computerized devices. For example, the system 1000 may be embodied within any of the Assignee's products (e.g., MacBook®, iMac®, iPad®, Apple Watch®, Apple TV® and iPhone®, etc.).

This exemplary system 1000 may be implemented through the use of a non-transitory computer-readable medium (e.g., a computer-readable apparatus) which may be embodied as software, hardware, or combinations of the foregoing. The non-transitory computer-readable medium may include one or more computer programs with computer-executable instructions, that when executed by, for example, one or more processing apparatus may implement one or more of the methodologies described subsequently herein. Moreover, while a specific architecture is shown in FIG. 10C, it would be readily apparent to one of ordinary skill given the contents of the present disclosure that the illustrated topology shown in, for example, FIG. 10C may be readily modified to include one or more applications 1002, one or more channels 1004, one or more pool of resources 1006 associated with a respective application, one or more flow switches 1008, one or more pool of resources 1010 managed by, for example, one or more drivers 1012. These and other variants would be readily understood by one or ordinary skill given the contents of the present disclosure with the illustration contained within FIG. 10C merely being exemplary.

FIG. 10C illustrates three applications 1002A, 1002B, and 1002C that reside within user space. One or more of these applications 1002A, 1002B, and 1002C may include its own communications stack as is described in additional detail supra. Each of these applications 1002A, 1002B, and 1002C may further communicate with the kernel space through respective channels 1004A, 1004B, and 1004C which are coupled with a respective pool of dedicated resources 1006A, 1006B, and 1006C. Some (or all) of the data resident within these pools of dedicated resources 1006A, 1006B, and 1006C may be communicated to managed pools of resources 1010A, 1010B via a flow switch apparatus 1008.

As shown in FIG. 10C, each single entity managed pool of resources 1010 is separate and distinct from the pool of resources 1006 associated with respective applications 1002. The single entity 1012 may control access to the managed pool of resources 1010; for example, the single entity 1012B determines an allocation of pool resources 1010B for transferring the data stored in any one or more of pool resources 1006A, 1006B, 1006C. Similarly, each channel 1004 may control access to its managed pool of resources 1010; for example, the channel 1004 reads and writes to its corresponding allocation of pool resources 1006 for receipt/delivery.

In one exemplary embodiment, the flow switch 1008 apparatus is responsible for transferring data between pools 1006 and pools 1010. In some implementations, the flow switch apparatus 1008 may read data from one pool resource (e.g., pool 1006A) and write this data to another pool resource (e.g., pool 1010B) and vice versa. As an alternative implementation, the flow switch apparatus may redirect a pointer so as to enable data to be transferred from one pool resource (e.g., pool 1010B) to another pool resource (e.g., pool 1006A) and vice versa. In the case of trusted applications (e.g., first party applications), the single-entity managed pool of resources 1010 may be accessed directly via respective channels 1004. In some variants, this data may be compressed prior to transfer and decompressed prior to being read and/or may be encrypted prior to transfer and decrypted prior to being read. These and other variants would be readily apparent to one of ordinary skill given the contents of the present disclosure.

In some implementations, each managed pool of resources (e.g., by respective drivers 1010A, 1010B) are exclusively managed by a single entity (e.g., by respective drivers 1012A, 1012B). More directly, each driver 1012 may have exclusive control over its respective managed pool of resources 1010 and may further decide what data is transferred to/from its respective managed pool of resources 1010, along with how much data may be transferred to/from its respective managed pool of resources 1010 as well as what applications 1002 have access to its respective managed pool of resources 1010. In some variants, a single managed pool of resources (e.g., pool of resources 1010A or pool of resources 1010B) may be shared between multiple (two or more) drivers 1012A, 1012B. Such a variant may be useful as, for example, it may enable the flow switch 1008 and trusted application to move data between these interfaces without incurring the cost of memory copy operations and/or object allocations.

In some variants, the single entity may only allow unidirectional access e.g., either read from (or write to) the managed pool of resources 1010. Consequently, the single entity may allow unidirectional access e.g., either write to (or read from) the pool of resources 1006 associated with a given application. For example, driver 1012B entities may limit pool 1010B to only receiving or transmitting data.

In some alternative implementations, a pool of resources 1010 may be directly accessible via a channel 1004. Such implementations may be useful to boost the performance of trusted applications (such as so-called "first party" applications i.e., applications designed and implemented by the manufacturer of the device, "second party" applications i.e., applications designed and implemented by a trusted partner or vendor, etc.).

Each driver 1012A, 1012B may be assigned (or otherwise possess), its own respective IOMMU 1040A, 1040B. Each IOMMU 1040A, 1040B may communicate with the MMU (1032, FIG. 10A) associated with the kernel virtual address 1030. Each driver 1012A, 1012B may be assigned an arena 1034, which is composed of regions 1014. Each region 1014 may be further sub-divided by segments (or slabs) 1016. Within each segment (or slab) 1016 may be one or more objects 1018. While the present disclosure is presented in the context of one packet pool scheme, others may be substituted with equivalent success. More directly, any comparable data structure may be substituted with the arena, region, segment, object being merely exemplary.

Each packet pool (pool of resources) 1010A, 1010B may have distinct properties from other ones of the packet pools (or pools of resources). For example, latency and/or throughput may be correlated as a function of segment size. Additionally, the ability to flexibly adjust the size of the arena 1034, the region 1014, the segment 1016, and the objects 1018 in order to allocate (or deallocate) memory resources may be dependent upon the sizing for these respective elements. For example, a segment 1016 may only be freed (e.g., re-allocated), once all the objects 1018 within the segment 1016 have been freed. In other words, a single packet located within an object 1018 (and segment 1016) may not have yet been successfully sent, and accordingly, this single packet may prevent an entire segment 1016 from being reclaimed. Similarly, all segments 1016 must be freed for a region 1014 to be freed (e.g., re-allocated), and all regions 1014 must be freed for an arena 1034 to be freed (e.g., re-allocated).

In one such implementation, dynamic memory allocations are performed via a set of rings. A first "alloc" ring is used to store packet requests, a second "free" ring is used to store memory allocations that should be freed. During operation, the user space stack requests to allocate some packets via a single call, and the kernel in turn does the actual object allocations and attaches the objects to the alloc ring. Then when the user space stack is done with the objects, it attaches them to the free ring, and notifies the kernel via a single call. In turn, the kernel will free each object that is returned via the free ring. By using a ring based transfer mechanism, the user and kernel process can "batch" multiple allocation and deallocation operations together (e.g., at packet transfers); more directly, this allows the kernel to amortize system call cost over a time (e.g., packet calls). In other words, when network stack processing is moved into a process context, it is a challenge to allocate enough memory efficiently to enable each process to be able to achieve the maximum possible throughput. In one embodiment, an efficient scheme is needed to be able to dynamically scale up and down the memory available to each process according to the current throughput requirements. The user packet pool uses an efficient packet I/O mechanism to move memory buffers across the kernel-user boundary and utilizes channel sync stats to dynamically scale the amount of memory available to each channel.

Figure 11:
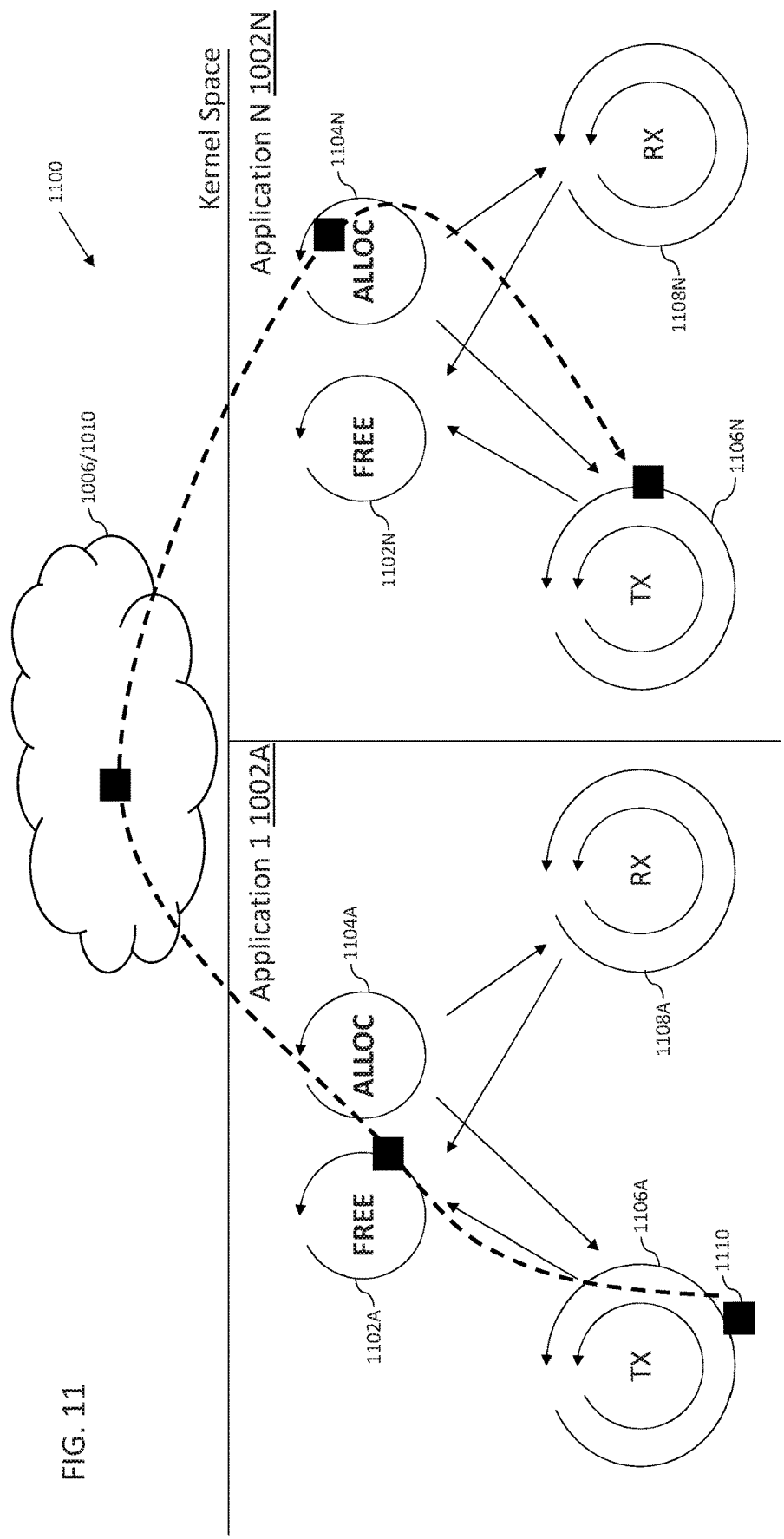
FIG. 11 is a logical block diagram of an exemplary scheme for the dynamic allocation of memory resources between different non-kernel applications, in accordance with various aspects of the present disclosure.

FIG. 11 is a logical block diagram of one such scheme for the dynamic allocation of memory resources between different non-kernel applications. The system 1100 illustrated in FIG. 11 includes a pool of resources 1006/1010 for a given number of applications 1002A, 1002N. Each application 1002A, 1002N may include four (4) data buffers, a free buffer 1102, an allocation buffer 1104, a transmit (TX) buffer 1106, and a receive (RX) buffer 1108. As illustrated in FIG. 11, each of these buffers 1102, 1104, 1106, 1108 constitute ring (or circular) buffers, although the specific type of buffer structure may be readily modified as would be understood by one of ordinary skill given the contents of the present disclosure. In some implementations, the TX buffer 1106 and the RX buffer 1108 may be combined into a single TX/RX buffer (not shown).

As illustrated in FIG. 11, application 1 1002A may determine that its allocation of TX buffers 1106A may be reduced. Accordingly, it may allocate, for example, a freed object 1110 to the free buffer 1102A. Accordingly, once the object 1110 has been freed, it may be returned to the operating system (and/or kernel) for this memory to be reclaimed. Another application N 1002N may determine that its allocation of TX buffers 1106N may need to be increased. Accordingly, this freed object 1110 may be reclaimed by this other application N 1002N. In some variants, the freed object 1110 may be read from the free buffer 1102A, and passed along to the allocation buffer 1104N associated with application N 1002N. This object 1110 may be then allocated to the TX buffer 1106N associated with application N 1002N. While the foregoing example is described in the context of freed objects 1110, it would be readily apparent to one of ordinary skill given the contents of the present disclosure that the freed objects 1110 may also constitute freed segments (slabs) (1016, FIG. 10B), freed regions (1014, FIG. 10B), or even freed arenas (1034, FIG. 10B). Moreover, the freed object 1110 may be allocated from the RX buffer 1108A, and allocated to either of the TX buffer 1106N or RX buffer 1108N associated with application N 1002N. In other words, more buffer memory may be added to the TX/RX buffers 1106, 1108 via the allocation buffer 1104, while buffer memory may be freed from the TX/RX buffers 1106, 1108 via the free buffer 1102. Accordingly, objects 1110 (or segments 1016, regions 1014, arenas 1034) may be reused or reallocated across different user stacks.

Split Metadata and Buffer Management

Exposing packet metadata to the hardware such as Wi-Fi chips and cellular baseband could lead to security vulnerabilities such as Return Oriented Programming and TOC-TOU attacks. In one exemplary embodiment, the system uses different memory regions for the packet metadata and the packet buffers to prevent malicious hardware from accessing the packet metadata. Only the packet buffers are I/O mapped and visible to the device.

In traditional BSD stacks, each mbuf can fit in, for example, a single 256 Kb object. An mbuf has metadata and possibly an external "cluster" for packet buffer data. However, all of the objects come from the same pool of mbufs. As a result, bugs in the driver could result in a stray DMA that corrupts other objects in the pool—which may not be limited to the driver (this is in kernel space). For example, if the corruption is in the cluster (inside the driver), then it is a corrupted IP packet. However, if the corruption is in the mbuf, than it could cause a broken link to the next mbuf (which could be outside of the driver).

Figure 12:
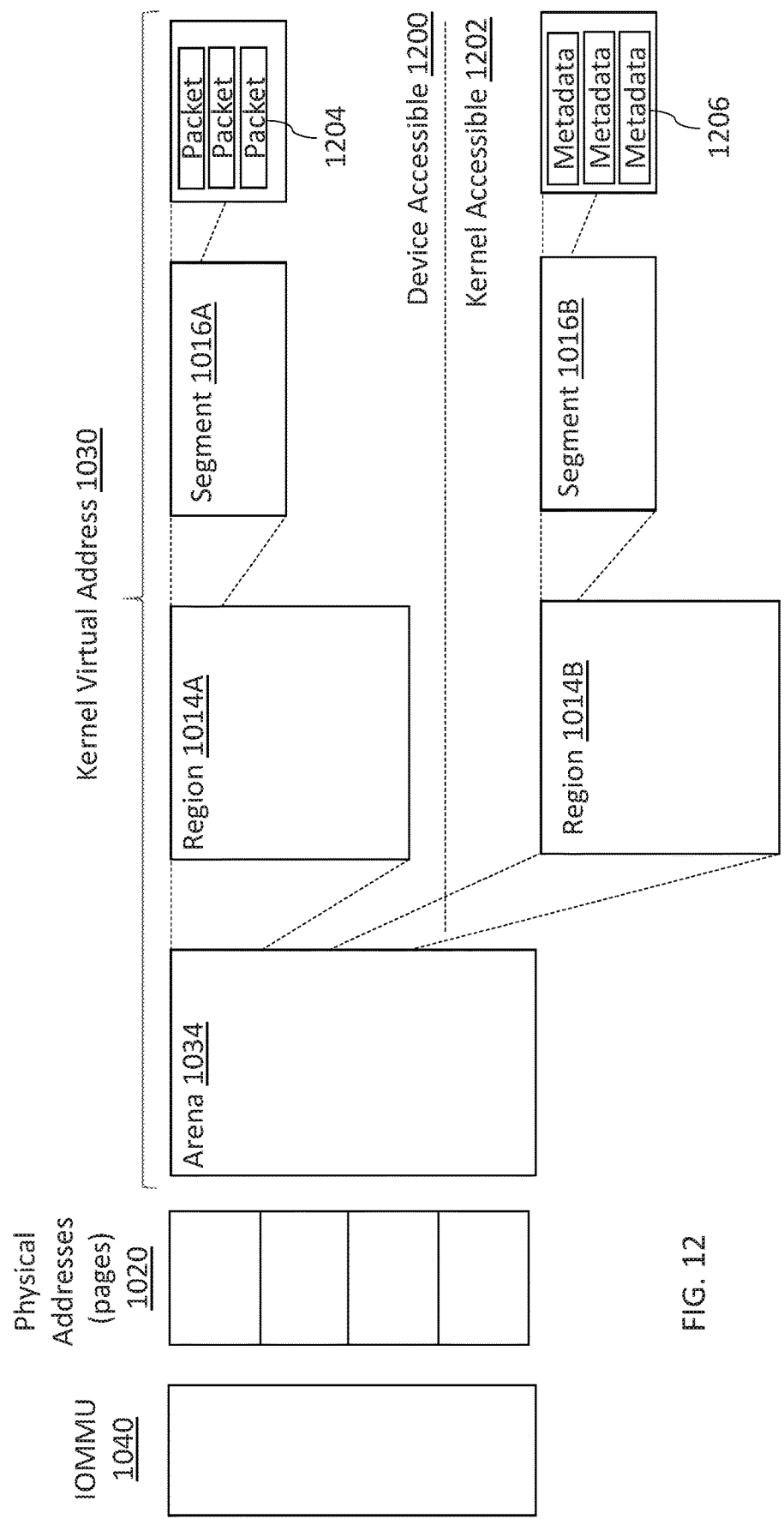
FIG. 12 is a logical representation illustrating how a driver may map its channel data to its packet pool, in accordance with various aspects of the present disclosure.

Referring now to FIG. 12, in one exemplary embodiment, a driver may map all of its channel data to its packet pool. For example, an arena 1034 (e.g., a 16 KB arena) may be split into four equally sized regions 1014 (e.g., four 4 KB regions). Each of these regions may be split into two equally sized segments 1016 (e.g., into 2 KB segments). These equally sized segments may then be split into objects 1018 (e.g., 256 B objects). In one exemplary embodiment, devices associated with the driver are only exposed to the packet buffer region 1204 (and not to the internal metadata structures 1206). Thus, the channel allocation has two components, the device accessible region 1200, and the kernel accessible region 1202. In some implementations, the driver may run on, for example, the host CPU in the context of the kernel and the kernel accessible region 1202 may be accessible to it.

In one variant, each region (the device accessible region 1200 and the kernel accessible region 1202) is defined with different properties. Each region 1200/1202 is specific for different uses and has different sizes, uses, permissions, etc. The device accessible region 1200 is provided in the IOMMU 1040 to the device. Although the kernel accessible region 1202 is still allocated for the driver, the kernel accessible region 1202 is not IOMMU 1040 mapped and hence, the device cannot read/write to these memory allocations located within the kernel accessible region 1202.

Segment-Based IOMMU Mapping Considerations

As previously noted a channel is associated with an arena 1034, that is composed of regions 1014, which are further composed of segments 1016. One of the aforementioned benefits of the purgeable memory hierarchy within the context of the user space networking stack, is that portions of the memory can be dynamically freed and/or allocated throughout the duration of the stack.

However, certain device drivers require that their memory is wired on demand e.g., the system memory shared with the hardware device may need to be wired during an I/O operation. Consequently, various embodiments of the present disclosure can wire down and I/O map a memory segment 1016 within the shared channel space. Since looking up the I/O bus address through an Input/Output Memory Management Unit (IOMMU) 1040 is not cheap, mapping a memory segment also has the benefit of being able to quickly derive the I/O bus address for all the packet buffers within that memory segment based on the single memory segment lookup.

In one such implementation, the request to map the memory segment using the memory management unit (IOMMU, MMU, etc.), is triggered by a constructor/destructor callback from the memory segment, and can be extended and overridden by each driver via object-oriented sub-classing to implement driver specific behavior.

In other words, a packet buffer is typically smaller than a page size in physical memory 1020, but the IOMMU 1040 requires mappings that are multiples of a page size. Looking up an I/O bus address can also be expensive.

Within the packet pool, use of a memory segment 1016 which is guaranteed to be a multiple of a page size is most efficient as the smallest memory unit for I/O mappings. Each memory segment 1016 is then divided into several packet buffers 1018. Only one I/O bus address lookup is required for all the packet buffers within that segment 1016, and this I/O bus address can also be cached within the segment object 1018.

DMA (memory mapped) access to mbufs would allow a single driver to corrupt any mbuf (a pool of generic mbufs was used by the stack for all applications). For example: if there was an attack on the hardware, the attacker's code in hardware firmware could see the entire mbuf pool (which may have very sensitive information).

In traditional BSD, the drivers had a bounce buffer so that they didn't directly map packet buffers. However, bounce buffers are inefficient because they add an extra copy step. "Bounce buffers" are created to securely enable a driver to perform DMA on an address that is not reachable by its peripheral e.g., for security reasons. Data is first copied to the bounce buffer, and then safely copied out of the bounce buffer.

In one exemplary embodiment, the packet buffers are directly mapped into driver space (which is specifically allocated to each driver). For drivers that are bus masters, the packet buffers are mapped directly into bus address space via IOMMU this is more efficient (no bounce buffer), and just as secure (drivers do not share resources).

An IOMMU 1040 (input output memory management unit) is a MMU that enables a driver to DMA (direct memory access) large amounts of data from the main memory. The IOMMU 1040 takes the kernel virtual address 1030 and generates an IOMMU address (this prevents malicious attacks, because the controller can stop an errant access). Wired memory remains present at the same physical (and virtual) memory addresses; it is not purgeable even if it is not being used. The wiring may occur on a "segment" 1016 basis.

Figure 13:
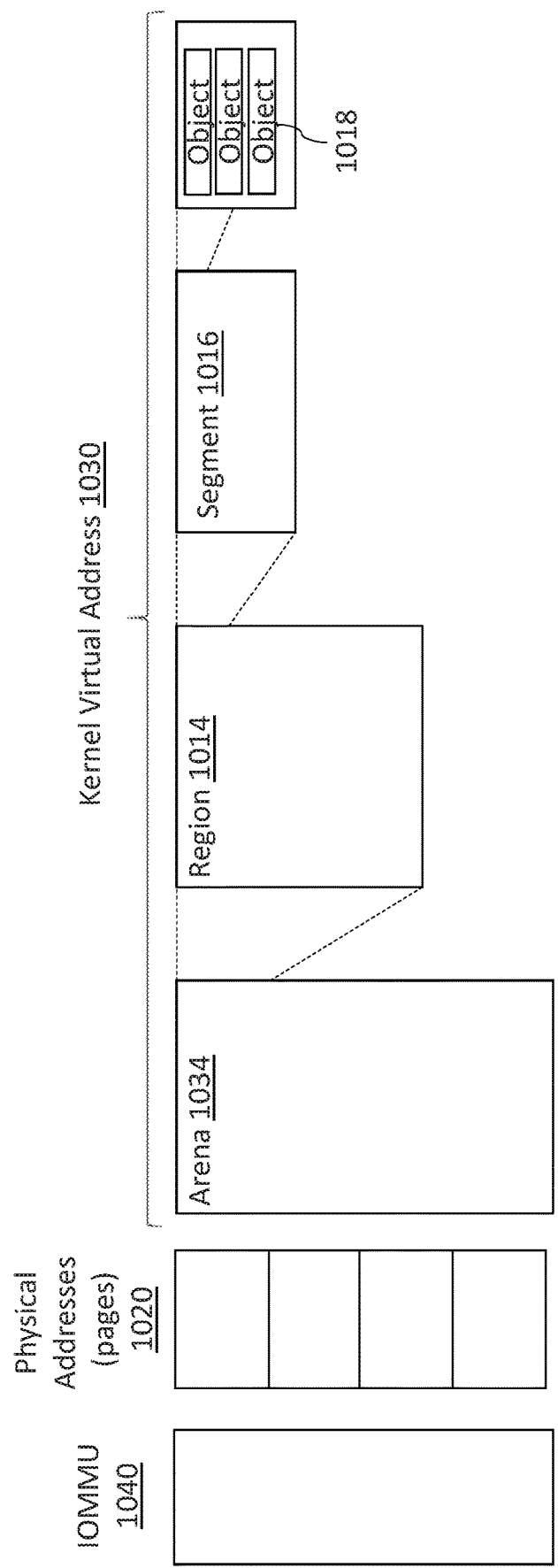
FIG. 13 is a logical representation illustrating segments being sized in accordance with physical page addresses, in accordance with various aspects of the present disclosure.

As shown in FIG. 13 a packet (object) 1018 is usually smaller than a physical page associated with a physical address in memory 1020. In some implementations, the packet pool allocation should be sized such that a given segment 1016 is guaranteed to be a multiple (e.g. one, two, three, etc.) of a given physical address page 1020. For example, the size of a given segment 1016 may equal the size of a given page size for a physical address 1020. As but another example, the size of a given segment 1016 may equal the size of two given page sizes for a physical address 1020. As yet another example, the size of a given segment 1016 may equal the size of nine given page sizes for a physical address 1020. These and other variants would be readily apparent to one of ordinary skill given the contents of the present disclosure.

In other words, the driver pool is composed of segments 1016 which are composed of one or more multiples of a physical address 1020 page size; each page in the physical address space 1020 can hold multiple packet buffers 1018. Thus, under such memory architectures, only one I/O bus address lookup in the IOMMU 1040 is required for all the packet buffers 1018 within that segment 1016. The IOMMU bus address can also be locally stored (e.g., cached) within the segment 1016 object—so that, for example, the driver gets the IOMMU 1040 generated address for free.

A driver may independently determine its segment 1016 size. The driver should ideally balance how often a segment 1016 should be mapped/removed, and how much of the segment 1016 is in continuous use. The cost of adding/removing an entry (by segment 1016) to the IOMMU 1040 is not "free". A single packet 1018 that has not been delivered also prevents the entire segment 1016 from being freed. Large segments 1016 waste physical address 1020 memory, while small segments 1016 waste IOMMU 1040 mapping/removal costs. Accordingly, by guaranteeing that a given segment 1016 size is a multiple (e.g., one or more) of a physical address 1020 page size, a number of benefits may be gained. For example, such a memory architecture scheme may amortize the cost of mapping/look-ups in the IOMMU 1040. These segments are all nicely page size aligned, so that they are easily mapped to the IOMMU 1040. The IOMMU 1040 mapping may also be cached within/for the segment 1016 so that the driver can look up bus addresses from the cache without having to do another IOMMU 1040 lookup.

Multi-Buflet Descriptors (Array)

Existing systems allocate memory to hold the largest possible frame size, but jumbo frames need to be supported in a memory efficient manner.

In one embodiment, a packet can hold an array of buflets, each buflet points to a fixed size block of memory allocated from a pool. The binding between the buflets and a packet can be formed on demand. This scheme allows a packet to have a variable number of buflets depending on the size of the payload. This also makes it easier to support scatter-gather style DMA engines by handing it buflets, which are uniform by nature.

Driver Managed Pool Resources

As used herein, "wired" memory refers to memory allocations that are backed by actual physical memory; in contrast, "purgeable" memory refers to memory allocations that may be either actually present or virtually present (virtually present memory can be recalled from a larger backing memory, with a cache lookup penalty). Notably, the aforementioned mbufs for traditional in-kernel operation are wired memory; however, the memory allocations for channel I/O disclosed in the various described embodiments are generally purgeable.

In some cases, a device driver may require a pool of packet buffers to support direct memory access (DMA). In one exemplary embodiment, in order to support DMA within the shared purgeable memory, the driver dynamically maps into the Input/Output Memory Management Unit (IOMMU) aperture. In some variants, the driver managed pool of resources can be controlled by the driver (e.g., not by the user or kernel process). Various embodiments may further allow the pool to be exclusive to the driver, or shared among several drivers. Read and write attributes can also be restricted on both the host and the device side based on the I/O direction.

In other words:

A system global packet buffer pool is suboptimal in terms of resource allocation, and does not offer the ability to deploy device/driver specific security policies.

In one exemplary embodiment, a packet buffer pool managed and owned by a driver that can be dedicated for that driver, or shared among several drivers is disclosed. The owner of the pool handles notifications to dynamically map and unmap the pool's memory from its device IOMMU aperture. This same notification can also wire/un-wire the memory as needed. Read and write attributes can also be restricted on both the host and the device side based on the I/O transfer direction for added security.

Methods

FIGS. 14A-14B are logical block diagrams of a general method 1400, 1450 for, for example, changing a packet pool dynamically based on the packet usage that is specific to a non-kernel space application. As a brief aside, a static memory allocation for a given packet pool means that the memory allocation does not change size over time. Conversely, a dynamic memory allocation for a given packet pool means that the memory allocation may change size (although it doesn't necessarily have to change size) over time. The packet pool data structures may be re-used by changing ownership between different packet pools. In some implementations, the receive and transmit ring data structures reuse memory buffers based on so-called "free" and "allocate" ("alloc") ring data structures (see also discussion with respect to FIG. 11). The properties of the packet pool data structures may be dynamically modified. For example, the size and access permissions of various regions of a packet pool are changed based on non-kernel application considerations. In one such variant, the segments of the packet pool are selected to optimize driver application considerations; such as IOMMU access, priority, latency considerations for the non-kernel application and/or throughput considerations for the non-kernel application.

At step 1402 of method 1400, the memory allocation requirements for a non-kernel space application is determined. The non-kernel space application may be a user space application in some implementations. The non-kernel space application may also be a driver space application in some implementations. If the current memory allocation for a non-kernel space application consumes more memory allocations than is necessary for the given non-kernel space application, the given non-kernel space application determines whether any purgeable memory is available at step 1404. The purgeable memory made available at step 1404 may include memory that has been previously allocated to a transmission buffer (e.g., transmission ring 1106, FIG. 11), has been previously allocated to a receive buffer (e.g., receive ring 1108, FIG. 11), and/or has been previously allocated to a bounce buffer, etc.

If it is determined that purgeable memory is available at step 1404, the given non-kernel space application begins allocating purgeable memory to the free buffer (1102, FIG. 11) at step 1406. The purgeable memory to be allocated to the free buffer (1102, FIG. 11) may be ordered within a queue of requests. The queue may include a ring data structure in some implementations. The ordering of the queue may be based on priority in some implementations. For example, lower priority memory objects (1018, FIG. 13) may be placed in the free buffer ahead of higher priority memory objects (1018, FIG. 13). Conversely, higher priority memory objects (1018, FIG. 13) may be placed in the free buffer ahead of lower priority memory objects (1018, FIG. 13). This priority may be determined based on expected use of the contents of the memory object (1018, FIG. 13), the historical use of the contents of the memory object (1018, FIG. 13) and/or based on other prioritization schemes.

In addition to the placement of memory objects (1018, FIG. 13) in the free buffer, memory segments (1016, FIG. 13) may be placed into the free buffer (1102, FIG. 11), as long as all objects (1018, FIG. 13) associated with a given memory segment (1016, FIG. 13) have been freed. Moreover, regions (1014, FIG. 13) may be placed into the free buffer (1102, FIG. 11), as long as all the segments (1016, FIG. 13) associated with the region have been freed. Additionally, an arena (1034, FIG. 13) may be placed into the free buffer (1102, FIG. 11), as long as all regions (1014, FIG. 13) associated with the arena have been freed. These and other variants would be readily appreciated by one of ordinary skill given the contents of the present disclosure.

In some implementations, the ordering of the queue may be based on arrival. For example, allocation of objects (1018, FIG. 13) to the free buffer (1102, FIG. 11) may be handled on a first-in-first-out (FIFO) basis. As but another non-limiting example, allocation of objects (1018, FIG. 13) to the free buffer (1102, FIG. 11) may be handled on a last-in-first-out (LIFO) basis. As yet another non-limiting example, allocation of objects (1018, FIG. 13) to the free buffer (1102, FIG. 11) may be handled on a round robin basis (i.e., a plurality of non-kernel applications may be given a time slice in order to provide for the allocation of objects (1018, FIG. 13) to the free buffer (1102, FIG. 11)). Other queuing schemes include the allocation of objects (1018, FIG. 13) based on oldest prioritization (fairness), newest prioritization, largest prioritization, most available memory resources, the performance of a given memory resource, etc. These and other queuing schemes would be readily apparent to one of ordinary skill given the contents of the present disclosure.

In some implementations, the queuing of purgeable memory to the free buffer (1102, FIG. 11) may be based on a ring data structure for the free buffer (1102, FIG. 11). In some variants, the size of the purgeable memory to be made available to other packet pools may be limited. In other words, only a limited number purgeable memory requests (made through the free buffer (1102, FIG. 11)) can be processed. Accordingly, requests that cannot be enqueued must wait until other memory has been allocated through the use of the free buffer (1102, FIG. 11), or these requests may be rejected.

Referring now to FIG. 14B, a methodology 1450 for the dynamic allocation of memory resources to a non-kernel space application is disclosed. At step 1452 of method 1450, the memory allocation requirements for a non-kernel space application is determined. The non-kernel space application may be a user space application in some implementations. The non-kernel space application may also be a driver space application in some implementations. If the current memory allocation for a non-kernel space application consumes fewer memory allocations than is necessary for the given non-kernel space application, the given non-kernel space application determines whether memory is available at step 1454.

If it is determined that memory is available at step 1454, the given non-kernel space application checks for available memory in the allocation ("alloc") buffer (1104, FIG. 11) at step 1456. The memory to be allocated in the allocation buffer (1104, FIG. 11) may be ordered within a queue of available memory resources. The queue may include a ring data structure in some implementations. The ordering of the queue may be based on priority in some implementations. For example, lower priority memory objects (1018, FIG. 13) may be available in the allocation buffer ahead of higher priority memory objects (1018, FIG. 13). This priority may be determined based on expected use of the contents of the memory object (1018, FIG. 13), the historical use of the contents of the memory object (1018, FIG. 13) and/or based on other prioritization schemes.

In addition to the availability of memory objects (1018, FIG. 13) in the allocation buffer, memory segments (1016, FIG. 13) may be present into the allocation buffer (1104, FIG. 11), as long as all objects (1018, FIG. 13) associated with a given memory segment (1016, FIG. 13) have been previously freed. Moreover, regions (1014, FIG. 13) may be present in the allocation buffer (1104, FIG. 11), as long as all the segments (1016, FIG. 13) associated with the region have been previously freed. Additionally, an arena (1034, FIG. 13) may be present in the allocation buffer (1104, FIG. 11), as long as all regions (1014, FIG. 13) associated with the arena have been previously freed. These and other variants would be readily appreciated by one of ordinary skill given the contents of the present disclosure.

In some implementations, the ordering of the queue may be based on arrival. For example, allocation of objects (1018, FIG. 13) to the allocation buffer (1104, FIG. 11) may be handled on a first-in-first-out (FIFO) basis. As but another non-limiting example, allocation of objects (1018, FIG. 13) to the allocation buffer (1104, FIG. 11) may be handled on a last-in-first-out (LIFO) basis. These and other queuing schemes would be readily apparent to one of ordinary skill given the contents of the present disclosure. In some implementations, the queuing of available memory to the allocation buffer (1104, FIG. 11) may be based on a ring data structure for the allocation buffer (1104, FIG. 11).

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A system for managing pools of resources, the system comprising:
    one or more processor apparatus;
    a driver for use with one or more non-kernel space applications separated from a kernel space, each of the one or more non-kernel space applications associated with a respective at least one free buffer, a respective at least one allocation buffer, and a respective at least one transmission buffer;
    physical memory for use by the driver and the one or more non-kernel space applications; and
    an input/output memory management unit (IOMMU) configured to provide translation of a kernel virtual address accessed by the driver to a physical address associated with the physical memory;
    wherein the one or more processor apparatus are configured to:
        determine memory allocation requirements for the driver; and
        responsive to a determination that purgeable memory associated with a first non-kernel space application of the one or more applications is available: allocate the purgeable memory from the respective at least one transmission buffer associated with the first non-kernel space application to the respective at least one free buffer associated with the first non-kernel space application so as to enable allocation, via the translation, of the purgeable memory to at least the respective at least one allocation buffer associated with a second non-kernel space application of the one or more applications, wherein the respective at least one free buffer associated with the first non-kernel space application stores a freed object, and wherein the freed object is read from the free buffer and passed along to the respective at least one allocation buffer associated with the second non-kernel space application, and allocated to the respective at least one transmission buffer associated with the second non-kernel space application.

2. The system of claim 1, wherein the purgeable memory is associated with one or more of a transmission buffer or a receive buffer, each of the one or more transmission buffer or the receive buffer being associated with the driver.

3. The system of claim 2, wherein the purgeable memory enables the one or more transmission buffer or the receive buffer to be increased in size or be decreased in size.

4. The system of claim 3, wherein the one or more processor apparatus is further configured to:
    determine the memory allocation requirements for the driver; and
    when more memory is required to be allocated to the driver, check an allocation buffer for available memory resources to be allocated to the driver.

5. The system of claim 4, where each of the at least one free buffer and the at least one allocation buffer comprises at least one ring buffer.

6. The system of claim 1, wherein the driver is allocated an arena of memory resources within the physical memory, the arena of memory resources being exclusively assigned to the driver.

7. The system of claim 6, wherein the arena of memory resources that is exclusively assigned to the driver is further sub-divided into a plurality of regions, each of the plurality of regions being further sub-divided into a plurality of segments, each of the plurality of segments being further sub-divided into a plurality of objects.

8. The system of claim 7, wherein the purgeable memory associated with the driver comprises a first segment of the plurality of segments, the allocation of the purgeable memory to the free buffer occurs after all objects within the first segment have been freed.

9. The system of claim 1, wherein the purgeable memory comprises a plurality of objects, each object of the plurality of objects being assigned to the free buffer in accordance with a prioritization scheme.

10. The system of claim 9, wherein the prioritization scheme comprises allocation of one or more objects of the plurality of objects that has a higher level of priority than other ones of the plurality of objects.

11. The system of claim 10, wherein determination of the higher level of priority is based on expected use of the one or more objects.

12. The system of claim 10, wherein determination of the higher level of priority is based on historical use of the one or more objects.

13. The system of claim 9, wherein the prioritization scheme comprises an ordering of the plurality of objects based on an order of arrival for the plurality of objects.

14. The system of claim 1, wherein a portion of the at least second non-kernel space applications comprises at least one user-space application.

15. The system of claim 14, wherein another portion of the at least second non-kernel space applications comprises one or more other drivers.

16. A method for managing resources, the method comprising:
    evaluating a memory requirement for an application in non-kernel space separated from a kernel space, wherein the application includes a free buffer, an allocation buffer, and a transmission buffer;

evaluating a consumption of memory for the application in non-kernel space;

evaluating an availability of a purgeable portion of the consumed memory, the purgeable portion being allocated to a first buffer associated with the application in non-kernel space; and queuing an allocation of the purgeable portion from the first buffer to a second buffer associated with the application in non-kernel space, the allocation enabling the purgeable portion to be reallocated to another application in non-kernel space via a kernel space memory management process, wherein the first buffer is selected from the free buffer, the allocation buffer, or the transmission buffer of the application, wherein the free buffer of the application stores a freed object, the free object is read from the free buffer and passed along to an allocation buffer associated with another application, and allocated to a transmission buffer associated with another application in non-kernel space.

17. The method of claim 16, wherein the non-kernel space comprises either a user space or a driver space.

18. The method of claim 16, wherein:

the evaluating the availability of the purgeable portion of the consumed memory comprises determining that a then current memory allocation for the application in non-kernel space is greater than a memory allocation required by the application; and the queuing the allocation of the purgeable portion comprises placing the purgeable portion within a queue of requests in a prescribed order relative to one or more other memory objects.

19. A non-transitory computer-readable apparatus comprising at least one storage medium, the at least one storage medium comprising a plurality of instructions configured to, when executed by a processing apparatus, cause a computerized apparatus to:

based at least on an evaluation of respective memory requirements for a first non-kernel space application and a second non-kernel space application, determine an adjustment in an allocation for a buffer associated with the second non-kernel space application, wherein the first non-kernel space application includes a first free buffer, a first allocation buffer, and a first transmission buffer, and the second non-kernel space is application includes a second free buffer, a second allocation buffer, and a second transmission buffer; and receive and allocate, via the buffer associated with the second non-kernel space application, a prescribed amount of assignable memory portions purged from a buffer associated with the first non-kernel space application selected from the free buffer, the first allocation buffer, or the first transmission buffer, the purge occurring based on the memory requirement for the first non-kernel space application, the receipt occurring via a pool of resources residing in kernel space, wherein the first free buffer stores a freed object, the free object is read from the first free buffer and passed along to the second allocation buffer, and allocated to the second transmission buffer.

20. The non-transitory computer-readable apparatus of claim 19, wherein the adjustment in the allocation for the buffer associated with the second non-kernel space application comprises an increase in the allocation therein; and the prescribed amount of assignable memory portions is purged from the first non-kernel space application based at least on a decrease in an allocation for a buffer associated with the first non-kernel space application.

* * * * *